(12) United States Patent
Wang et al.

(10) Patent No.: US 12,444,501 B2
(45) Date of Patent: Oct. 14, 2025

(54) MEDICAL DEVICE MANAGEMENT METHOD AND RELATED DEVICE

(71) Applicant: SHENZHEN MINDRAY BIO-MEDICAL ELECTRONICS CO., LTD., Shenzhen (CN)

(72) Inventors: Shengping Wang, Shenzhen (CN); Li Xu, Shenzhen (CN); Weiwei Dai, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 295 days.

(21) Appl. No.: 18/213,965

(22) Filed: Jun. 26, 2023

(65) Prior Publication Data
US 2023/0335275 A1    Oct. 19, 2023

Related U.S. Application Data

(63) Continuation of application No. PCT/CN2020/139188, filed on Dec. 25, 2020.

(51) Int. Cl.
*G16H 40/67* (2018.01)
*G06F 21/32* (2013.01)
(Continued)

(52) U.S. Cl.
CPC ............ *G16H 40/67* (2018.01); *G06F 21/32* (2013.01); *G16H 10/60* (2018.01); *G16H 40/20* (2018.01); *G16H 40/40* (2018.01); *G16H 15/00* (2018.01)

(58) Field of Classification Search
CPC ........ G16H 40/67; G16H 40/20; G16H 10/60; G16H 40/40; G16H 15/00; G06F 21/32
See application file for complete search history.

(56) References Cited

U.S. PATENT DOCUMENTS

| | | | |
|---|---|---|---|
| 8,620,682 B2 * | 12/2013 | Bechtel | G16H 40/63 705/2 |
| 10,395,772 B1 * | 8/2019 | Lucas | G16H 10/60 |

(Continued)

FOREIGN PATENT DOCUMENTS

| | | |
|---|---|---|
| CN | 102857381 A | 1/2013 |
| CN | 103959737 A | 7/2014 |

(Continued)

OTHER PUBLICATIONS

International Search Report issued in corresponding International Application No. PCT/CN2020/139188, mailed Sep. 26, 2021, 4 pages.

*Primary Examiner* — Michael I Ezewoko
(74) *Attorney, Agent, or Firm* — PV IP PC; Wei Te Chung

(57) ABSTRACT

A central station, a medical device, and a terminal device are disclosed. The central station is connected to at least two types of medical devices including at least one monitoring device. After receiving medical data sent by any medical device, the central station determines a device group that the medical device belongs to; and controls displaying the medical data in a display area corresponding to the device group. Medical devices in the same device group have an association relationship, and medical data of the medical devices with the association relationship are fused and displayed in the same display area.

19 Claims, 13 Drawing Sheets

(51) Int. Cl.
  *G16H 10/60*   (2018.01)
  *G16H 40/20*   (2018.01)
  *G16H 40/40*   (2018.01)
  *G16H 15/00*     (2018.01)

(56) References Cited

U.S. PATENT DOCUMENTS

2019/0132200 A1\* 5/2019 Sobie .................. H04L 41/0806
2020/0401992 A1\* 12/2020 Sobie, III ............... G06Q 10/10

FOREIGN PATENT DOCUMENTS

CN   105069308 A   11/2015
CN   108320790 A   7/2018

\* cited by examiner

MEDICAL DEVICE MANAGEMENT METHOD AND RELATED DEVICE

CROSS-REFERENCE TO RELATED APPLICATIONS

This application is a continuation of International Application No. PCT/CN2020/139188, filed on Dec. 25, 2020, the entire contents of which are expressly incorporated herein by reference.

TECHNICAL FIELD

The disclosure relates to the technical field of medical device, and more particularly to a medical device management method and related device.

BACKGROUND

A central station is a centralized management device, and medical devices in each ward can transmit patient related monitoring data to the central station for display. Medical staff can know patient condition by viewing the displayed data of the central station. Currently, there are many types of medical devices used by patients, and different types of medical devices implement different monitoring or treatment tasks for patients. For example, monitoring devices are mainly used for monitoring vital sign parameters, and ventilators are mainly used to assist or replace spontaneous respiration for patients.

At present, respective central stations are arranged for different types of medical devices at the nurse station, and medical staff monitor and view different medical devices at different central stations. This management scheme not only wastes device costs, but also makes it inconvenient for medical staff to monitor medical devices.

SUMMARY

This disclosure provides a medical device management method and related device, so as to save medical device management cost and improve monitoring convenience for medical staff.

According to a first aspect, an embodiment of this disclosure provides a medical device management method which is applied to a central station, wherein the central station is in communication connection with at least two medical devices, and medical devices of two different types in the at least two medical devices, are in communication connection with the central station through different channels; wherein one of the two different types is a monitoring device type, wherein the method includes:
  receiving medical data, which is transmitted by a target medical device, and determining a target device group, which corresponds to the target medical device, from at least one device group; wherein the target medical device is any one medical device of the at least two medical devices, and the at least two medical devices includes at least two types of medical devices; the device group consists of medical devices with an association relationship from the at least two medical devices;
  displaying, in a display area on a patient monitoring interface of the central station, which display area corresponds to the target device group, the medical data from the target medical device; wherein different display areas correspond to different device groups, and one display area is configured to display the medical data from the monitoring device and the medical data from at least one medical device which has a different type from the monitoring device, in a corresponding device group.

According to a second aspect, an embodiment of this disclosure provides a medical device management method which is applied to a medical device, including:
  acquiring device association information, which is configured to represent an association relationship between the medical device and other medical device(s), wherein the medical device has a different type from said other medical device(s), the medical device or said other medical device(s) at least includes a monitoring device; and
  transmitting the device association information to a central station which is in communication connection with the medical device, wherein the device association information is for the central station to classify the medical device and said other medical device(s) into a same device group.

According to a third aspect, an embodiment of this disclosure provides a medical device management method which is applied to a terminal device, including:
  acquiring device association information, wherein different device association information indicates patients who are associated with different medical devices, wherein the different medical devices includes at least two types of medical devices, and one medical device of the at least two types of medical devices, is a monitoring device;
  transmitting the device association information to a central station which is in communication connection with a target medical device, wherein the device association information is for the central station to classify medical devices which are associated with a same patient into a same device group.

According to a fourth aspect, an embodiment of this disclosure provides a central station, comprising:
  a communication module, which is in communication connection with at least two medical devices; medical devices of two different types in the at least two medical devices are respectively communicated with the central station through different channels, and one medical device of the medical devices of two different types is a monitoring device;
  a processor, which is configured to receive medical data, which is transmitted by a target medical device, and determine a target device group, which corresponds to the target medical device, from at least one device group; wherein the target medical device is any one medical device of the at least two medical devices, and the at least two medical devices includes at least two types of medical devices; the device group consists of medical devices with an association relationship from the at least two medical devices; and
  a display module, which is configured to display, in a display area on a patient monitoring interface of the central station, which display area corresponds to the target device group, the medical data from the target medical device; wherein different display areas correspond to different device groups, and one display area is configured to display the medical data from the monitoring device and the medical data from at least one medical device which has a different type from the monitoring device, in a corresponding device group.

According to a fifth aspect, an embodiment of this disclosure provides a medical device, comprising:
  a processor, which is configured to acquire device association information, which is configured to represent an association relationship between the medical device and other medical device(s), wherein the medical device has a different type from said other medical device(s), the medical device or said other medical device(s) at least includes a monitoring device; and configured to acquire medical data of a patient;
  a communication module, which is configured to transmit the device association information to a central station which is in communication connection with the medical device, wherein the device association information is for the central station to classify the medical device and said other medical device(s) into a same device group; and configured to transmit the medical data of the patient to the central station.

According to a sixth aspect, an embodiment of this disclosure provides a terminal device, comprising:
  a processor, which is configured to acquire device association information, wherein different device association information indicates patients who are associated with different medical devices, wherein the different medical devices includes at least two types of medical devices, and one medical device of the at least two types of medical devices, is a monitoring device;
  a communication module, which is configured to transmit the device association information to a central station which is in communication connection with a target medical device, wherein the device association information is for the central station to classify medical devices which are associated with a same patient into a same device group.

From the above technical solution, it can be seen that in the embodiment of the medical device management method provided in this disclosure, the central station is connected with at least two types of medical devices, including at least a monitoring device. After receiving medical data transmitted by any one medical device, the central station determines a device group where the medical device is classified into and displays the medical data in a display area which corresponds to the device group in a patient monitoring interface. Medical devices within the same device group have association relationships, and the medical data of these associated medical devices are fused and displayed in the same display area. Medical staff can understand the overall medical situation of the device group by observing the same display area, making management more convenient and simpler, and saving device costs for various types of central stations.

BRIEF DESCRIPTION OF DRAWINGS

In order to provide a clearer explanation of embodiments of this disclosure or the technical solutions in the prior art, a brief introduction is given to the accompanying drawings required in the description of the embodiments or prior art. It is evident that the accompanying drawings in the following description are only some embodiments of this disclosure. For ordinary technical personnel in the art, other accompanying drawings can be obtained based on these drawings without any creative effort.

DETAILED DESCRIPTION

The following provides a clear and complete description of the technical solution in embodiments of this disclosure, in conjunction with the accompanying drawings. Obviously, the described embodiments are only some embodiments of this disclosure, not all of them. Based on the embodiments in this disclosure, all other embodiments obtained by ordinary technicians in the art without creative labor fall within the protection scope of this disclosure.

The central station is usually arranged at a nurse station, and medical staff can observe information displayed by the central station to understand a working state of the medical device arranged next to the patient. Usually, various types of medical devices are equipped with different central stations for independent management. For example, a monitoring central station is arranged for monitoring devices, an infusion pump station is arranged for infusion pumps, a ventilator central station is arranged for ventilators. However, the arrangements of multiple types of central stations not only occupy spaces of the nurse station, but also interfere unified management for patient state information by medical staff.

For this purpose, an embodiment of this disclosure provides a medical device management method applied to a central station, which fuses and displays relevant information of multiple medical devices on the central station. The specific way of fusion is to classify medical devices with related relationship into one group, and associate and display relevant information of medical devices within the same medical device group. The following is an explanation of an embodiment of this method in conjunction with the diagram.

Figure 1:
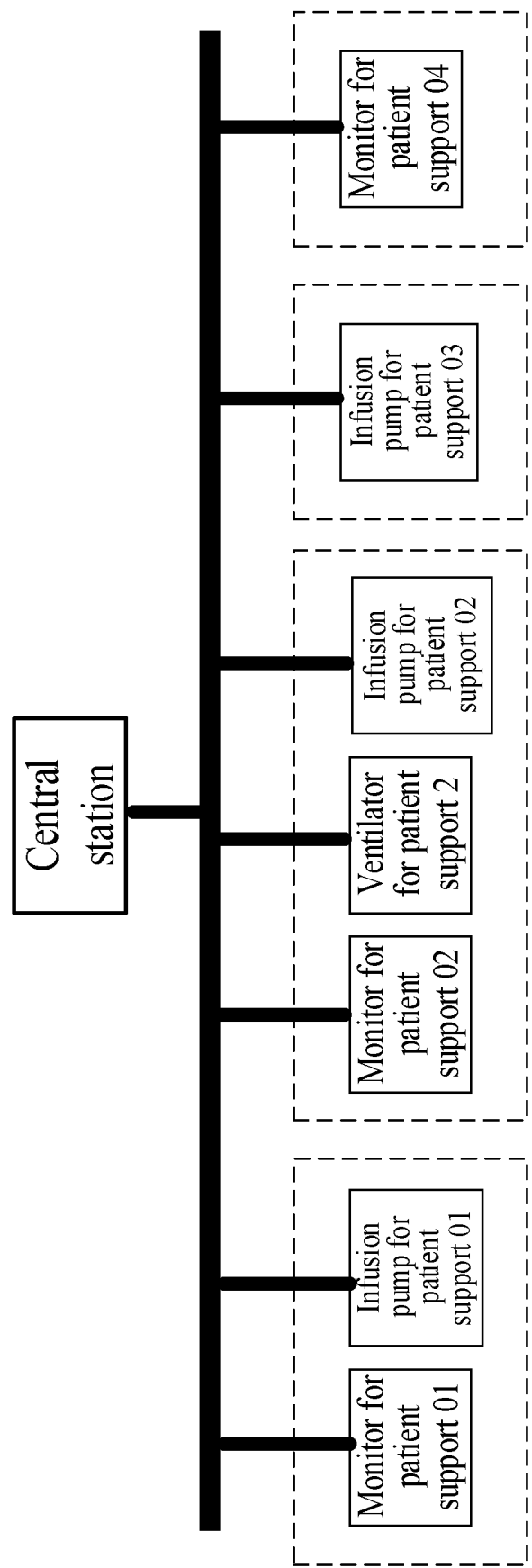
FIG. 1 is a diagram for communication connection between a central station and a medical device.

In the embodiment of this disclosure, the central station in communication connection with at least two medical devices. The at least two medical devices have at least two different types. That is, the medical devices, which are in communication connection with the central station, at least belong to two different types of medical devices. Meanwhile, the at least two different types at least comprise a device type with monitoring function, such as a monitoring device of telemetry, transportation, wearable, or point measurement type. A specific form of the monitoring device is a monitor. Different types of medical devices are in communication connection with the central station through different channels. As shown in FIG. 1, an embodiment is provided, in which the central station is in communication connection with a monitor for patient support 01, an infusion pump for patient support 01, a monitor for patient support 2, a ventilator for patient support 2, an infusion pump for patient support 2, an infusion pump for patient support 3, and a monitor for patient support 4. According to an identity of patient supports associated with the medical devices, these medical devices are divided into two device groups, namely device group 1, device group 2, device group 3, and device group 4. It should be noted that according to the actual application situation, the medical devices connected with the central station are not limited to the three types mentioned above, but can also be any other types of medical devices. In addition, the number of device groups for the medical devices is not limited to three groups, and can be one group or any other number of groups. In addition, the basis for group division of medical devices is not limited to the associated patient supports, but can also be any other association relationships that can be expected by technical personnel in this field according to regulatory requirements.

Figure 2:
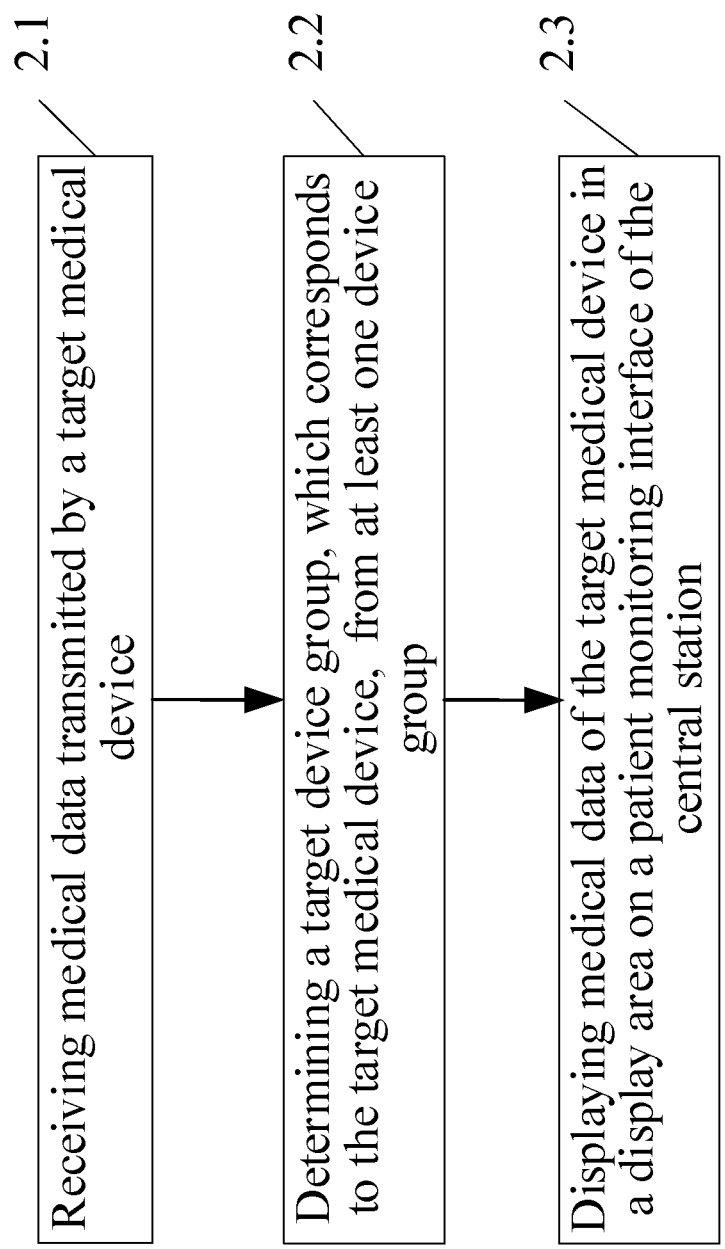
FIG. 2 is a flowchart of an embodiment of a medical device management method performed by a central station.

FIG. 2 provides a flowchart of an embodiment of a medical device management method applied to a central station, including steps 2.1 to 2.3.

In step 2.1, medical data transmitted by a target medical device, is received.

Specifically, any one of the at least two medical devices, which is in communication connection with the central station, can transmit medical data to the central station, and the central station receives the medical data transmitted by the medical device. For ease of description, any medical device can be referred to as a target medical device.

The medical data, which is transmitted by a target medical device can be data acquired by the target medical device itself, or data transmitted by other medical device to the target medical device. Medical data can include but is not limited to patient state data, device work data, etc. For example, the monitoring device can transmit patient vital sign monitoring data to the central station, the ventilator can transmit patient ventilation treatment state data to the central station, the infusion pump can transmit infusion state data during infusion process to the central station, the anesthesia machine can transmit work data during anesthesia gas providing process for patient to the central station, and so on. Medical data can include real-time vital sign monitoring data acquired by the monitoring device.

In step 2.2, a target device group, which corresponding to the target medical device, is determined from at least one device group.

Specifically, the at least two medical devices, which are connected with the central station can be classified into the at least one device group. The device group consists of medical devices with an associated relationship between these medical devices. In other words, the medical devices within the same device group have a certain association relationship, which can include an association relationship indicates the medical devices are associated with the same patient support and/or the medical devices are associated with the same patient. It should be noted that, according to actual medical management requirements, any medical device that wants to be associated can be configured with an association relationship, and any medical device that satisfies the association relationship can be classified into the same medical device group. Please refer to the following instructions for the specific group division methods, which is not elaborated here.

The central station is in communication connection with these medical devices, and can record group division information of device groups in advance, such as which one medical device and which other medical device are classified into one group, or which medical device(s) is(are) included in a certain device group. After receiving the medical data transmitted by the target medical device, the central station needs to determine the device group to which the target medical device belongs. To facilitate distinguishing from other device groups, the device group to which the target medical device belongs can be referred to as a target device group. For example, as shown in FIG. 1, if the central station receives medical data transmitted by one monitoring device, it can be determined that the device group to which the monitoring device belongs is device group of patient support 01.

In step 2.3, the medical data from the target medical device, is displayed in a display area on a patient monitoring interface of the central station, wherein the display area corresponds to the target device group.

Specifically, the central station can integrate or connect a display to display the patient monitoring interface. This patient monitoring interface can be divided into one or more display areas, where one display area corresponds to one device group, and different display areas correspond to different device groups. After determining the target device group to which the target medical device belongs, the display area corresponding to the target device group, is further determined. Then the medical data received from the target medical device in step 2.1, is displayed in the display area. It should be noted that the display area of the patient monitoring interface is configured to display the medical data of the monitoring device and the medical data of at least one medical device which has a different type from the monitoring device in the corresponding device group, so as to fuse the medical data of the medical device of the monitoring type with the medical device of other type and to display fused data in the same area, enabling the medical staff to easily view the medical data of monitoring device and other medical device.

It can be understood that the medical data transmitted to the central station from any medical device, which is connected with the central station, can be processed through the above steps and then displayed in a certain display area of the patient monitoring interface. The medical data of medical devices within the same device group can be displayed in the same display area. Furthermore, in order to indicate the user that which device group the display area corresponds to, an identifier of the device group corresponding to the display area can be displayed on the patient monitoring interface. The identifier of device group can be patient support identifier and/or patient identifier associated with the device group, or other identifier that can distinguish different device groups. It should be noted that the patient supports associated with the medical devices may belong to different medical institutions. In order to distinguish, the patient support identifier can include an identifier of the medical institution to which the patient support belongs, including but not limited to departments, wards, etc.

Figure 3:
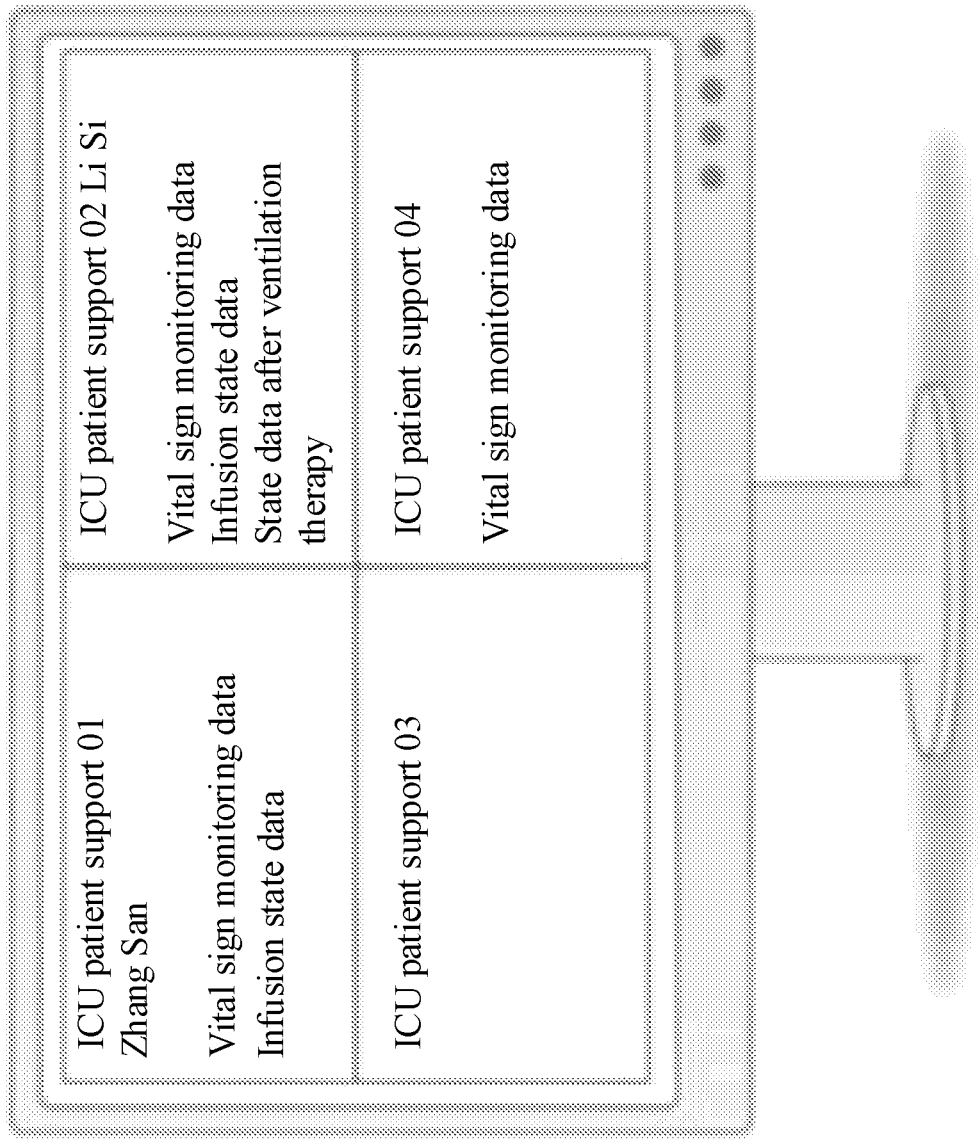
FIG. 3 is an example diagram of a patient monitoring interface.

Corresponding to the device connection example shown in FIG. 1, FIG. 3 provides an example of a patient monitoring interface. The patient monitoring interface is divided into four display areas, with different display areas corresponding to different patient supports. The medical data transmitted by the medical device associated with the same patient support is displayed in the same display area. For example, the vital sign monitoring data transmitted by the monitoring device for patient support 01 and the infusion state data transmitted by the infusion pump for patient support 01, are displayed in the same display area which corresponds to the patient support 01. Similarly, the medical data transmitted by medical devices associated with the patient support 02 or patient support 4 are displayed in the corresponding display areas of the patient support 02 or patient support 4. Moreover, the display area can display or hide the identifier of the patient associated with device group. For example, the display areas corresponding to patient supports 01 and 02 respectively display the patient identifiers of the patients who are associated with the patient supports, while the display area corresponding to patient support 04 hides the patient identifier of the patient who is associated with the patient support 04. It should be noted that medical data can be displayed in any preset form, such as numeric values, waveform graphs, trend graphs, images, tables, etc., which can include any one or more of vital sign parameter waveforms, vital sign parameter values, physiological alarms, and working parameters of medical device. This disclosure does not specifically limit this. The medical data transmitted by multiple medical devices is fused and displayed in the same display area. Medical staff can concentrate on observing the medical data in the same display area to analyze the corresponding medical situation of the patient in that display area. For example, if there is an abnormal alarm in the vital sign parameters of the patient, medical staff can observe the medical related data transmitted by the infusion pump or the medical related data transmitted by the ventilator in that area. It can be found that the possible cause of the abnormal alarm is abnormal medication or blocked ventilation of the infusion pump.

It should be noted that medical data is not displayed in the display area which corresponds to patient support 03. There may be several situations. the medical data in this display area is hidden, the medical devices in the corresponding device group of this display area have not yet transmit the medical data to the central station (i.e., the medical devices are not yet online). If it belongs to the second situation, the patient monitoring interface cannot be divided to provide the display area corresponding to the device group, that is, FIG. 3 can only include three display areas. After receiving the medical data transmitted by the infusion pump for patient support 03, the display area corresponding to patient support 03 can be provided and the medical data from the infusion pump for patient support 03 can be displayed in this display area.

That is to say, the display of the display area includes at least two modes. The central station determines the number of device groups corresponding to the connected medical devices, and divides an equal number of display areas in the patient monitoring interface. The central station displays all the display areas divided by the interface, while displaying the patient monitoring interface. Alternatively, after determining the target device groups corresponding to the target medical devices, the central station determines whether the patient monitoring interface is divided into corresponding display areas for the target device groups. If not, the central station divides the corresponding display areas for the target device groups for displaying.

From the above technical solution, it can be seen that in the medical device management method provided in an embodiment of this disclosure, the central station determines the device group which the medical device belongs to and the corresponding display area of the device group after receiving the medical data transmitted by any medical device, and displays the medical data in the display area of the patient monitoring interface. Medical devices within the same device group have an association relationship, and the medical data of these associated medical devices are fused and displayed in the same display area. Medical staff can understand the overall medical situation of the device group by observing the same display area, making management more convenient and simpler. Moreover, medical data of different types of medical devices can be fused into the same patient monitoring interface, which saves device costs for different types of central stations. Although there is currently a medical data fusion solution that adds a serial port connection module to the monitoring device, and other medical devices such as ventilators and anesthesia machines near the patient support are connected with the monitoring device through this serial port connection module, and the monitoring device transmits medical data from itself and other medical devices to the central station, this method has additional requirements for the device performance of the monitoring device, and the interconnection of devices requires the use of serial cables, which makes the movement of the medical devices more inconvenient. In the embodiment of this disclosure, the medical device is connected with the central station through their respective communication modules, without relying on the serial port interconnection of the monitoring device. The movement of the medical device is not limited and has higher flexibility.

The medical devices which are connected with the central station may belong to different medical institutions, such as different wards or departments. In practical applications, medical staff may only need to pay attention to the medical device of a specific medical institution. In order to satisfy the customized viewing requirements of users, this disclosure provides another example of monitoring method. This example can also provide customized viewing steps on the basis of the above implementation of medical device management method.

The customized viewing steps specifically include: determining target viewing device group(s), which is(are) associated with a target medical institution, from the at least one device group, in response to a viewing instruction of a user for a medical device in the target medical institution; wherein at least one target viewing device group exists; determining medical data which corresponds to a same target viewing device group from medical data, which is transmitted by the at least two medical devices; and displaying, in display area(s) of the patient monitoring interface, the medical data of target viewing device group(s), which target viewing device group(s) correspond(s) to the display area(s).

Specifically, the central station can provide selection options for medical institutions, such as various departments and wards that can be viewed. Medical staff can select the medical institution they want to view, which can be referred to as the target medical institution. The central station determines the device groups associated with the target medical institution through any of the following methods. For ease of description, the determined device group can be referred to as the target viewing device group.

In method 1, the central station can record the medical institution which is associated with each device group, so that after receiving a viewing instruction for a target medical institution, the central station can determine a target viewing device group from the at least one device group. In method 2, if the group division of medical devices is based on a binding relationship between the medical device and the patient support, that is, the medical devices, within the same device group, are associated with the same patient support, the central station can first determine the target patient support associated with the target medical institution based on the association relationship between the medical institution and the patient support, and then determine the device group which is consisted of medical devices bound to the target patient support as the target viewing device group, rather than directly record the association relationship between the device group and the medical institution. For example, when medical staff select intensive care unit (ICU) as the target medical institution, the central station determines that the ICU includes ICU patient support 01, and the device group, which is consisted of the medical devices bound to the ICU patient support 01, is determined as the target viewing device group. In method 3, if the group division of medical devices is based on a binding relationship between the medical device and the patient, that is, the medical devices within the same device group are associated with the same patient, then the target viewing device group is determined in the same way as method 2 above. In method 4, if the group division of medical devices is based on a binding relationship between the medical device and both of the patient and the patient support, that is, there is a one-to-one correspondence between the patient support and the patient, that is one patient support is uniquely bound to one patient, and the binding relationship between the medical device and the patient or patient support indicates that the medical device is bound to both. In this case, the target viewing device group is also determined in the same way as in method 2 above.

After the central station determines the target viewing device group, it determines the corresponding medical data of the target viewing device group from the received medical data, and then displays the determined medical data on the patient monitoring interface. It should be noted that the target viewing device group includes one or more device groups, which are displayed in their respective display areas according to the method embodiment shown in FIG. 2 above, that is, in multiple display areas of the patient monitoring interface, the medical data, transmitted by medical devices within multiple target viewing device groups, is displayed simultaneously. Assuming that medical staff select Intensive Care Unit (ICU) as the target medical institution, the central station determines that the device groups associated with the ICU include four groups, namely device group for ICU patient support 01, device group for ICU patient support 02, device group for ICU patient support 03 and device group for ICU patient support 04. As shown in FIG. 3, the central station displays the medical data of these four device groups in different areas on the same screen.

It can be seen that through the medical device management method applied to the central station provided in the embodiment of this disclosure, medical staff can select to view the medical data of medical devices in a specific medical institution, and the medical devices belong to one or more device groups. The central station displays the medical data of different device groups in different display areas.

Furthermore, customized viewing requirements also include that, the medical data items, that medical staff in different roles may focus on, may not be the same. For example, nurses focus on vital sign monitoring data and medical related data of infusion pump, respiratory therapists focus on vital sign monitoring data and medical related data of ventilator, and device managers pay more attention to medical related data of all medical devices. To satisfy the above requirements, the central station can display corresponding medical data based on the roles of medical staff, achieving the goal of customizing display content according to roles.

Therefore, before presenting the medical data of the target viewing device group to the user after selecting the target medical institution, the method can further include following step: determining a user identity of the user, wherein the user identity is configured to indicate data item(s) of medical data that the user expects to view; and determining target medical data, which corresponds to the data item(s), from the medical data, which corresponds to the display area(s) of the patient monitoring interface.

Specifically, the user identity, can include but is not limited to doctor, nurse, anesthesiologist, device manager, and so on. The central station can obtain the user identity through any of the following methods.

In method 1, the user can input a customized viewing instruction, which carry the user identity. For example, the central station provides a user identity selection option. Selecting a certain user identity by the user means that the user enters a customized viewing instruction. After receiving the customized viewing instruction, the central station can obtain the user identity from it. In method 2, biometric information of the user is acquired and the user identity is identified according to the biometric information, which includes but is not limited to fingerprints, iris, voiceprints, facial features, etc. This identity recognition method does not require the user to manually input identity information, thus achieving automatic identity recognition. In method 3, the users can be equipped with an user information recording carrier, such as QR codes, identity recognition cards, etc. The recording carrier records the identity identifier of the user, such as work number, name, etc. The central station is equipped with corresponding recognition devices, which can obtain the identity identifier of the user from the identity information recording carrier of the user, and then determine the current user identity based on the corresponding relationship between the identity identifier and the user identity, such as being a doctor, nurse, anesthesiologists, etc.

The user identity can indicate the data items that the user expects to view, including but not limited to any one or more of: vital sign parameters, physiological alarms, technical alarms, operation state of medical device. After determining the user identity, the target medical data corresponding to the user identity can be further searched in the medical data associated with the target medical institution. Finally, when the central station displays the medical data of the target viewing device group, it specifically displays the found target medical data. It should be noted that if the target medical data corresponds to multiple different device groups, the central station displays the target medical data corresponding to different device groups in different display areas of the patient monitoring interface according to the scheme shown in FIG. 2 above.

It can be seen that the customized viewing steps included in this embodiment not only allow for customized display of medical data based on medical institutions, but also customized display of medical data based on user identity, satisfying the diverse customized viewing requirements of users.

For the embodiment of this medical device management method, the following additional explanations are provided. 1. The user identity can be not limited to professional identity, but also personal identity, so that each user can be preset with their corresponding data items that can be viewed, and the patient monitoring interface can be customized for different users. 2. When determining the target medical data based on the user identity and medical institution, there is no restriction on the order of use of the two conditions, and both conditions can also be executed simultaneously. 3. Furthermore, viewing data customization based on user identity and viewing data based customization on medical institutions can also be performed not all at once during the viewing process. This means that only a portion of medical data can be selected for display based on user identity, or a portion of medical data can be selected for display based on the desired medical institution. 4. After determining the user identity, the user identity can also be verified. Only after passing the authentication, the target medical data can be displayed in the display area of the patient monitoring interface to improve the security of medical data.

From the explanations of the above embodiments, it can be seen that the medical data transmitted by medical devices within the same device group is associated with the same patient. The central station can fuse and display the medical data of the same patient in the same display area of the patient monitoring interface, to facilitate observation of the user for the overall medical situation of the same patient. In practical applications, clock signals of different medical devices are not uniform, which leads to differences in timestamps of medical data for the same patient, which is acquired at the same time, thereby affecting the association accuracy of the medical data based on the timestamps through the central station. To solve this technical problem, the embodiment of this disclosure provides a medical device management method, which can also include a timestamp alignment and storage step based on any of the above embodiments: storing, as a medical data record set, medical data transmitted by medical devices within the same device group after timestamp alignment according to timestamp(s) of said medical data.

Specifically, the medical data received by the central station has a timestamp. If the timestamps of the medical data within the same device group are not aligned, the timestamps of the medical data within the same device group can be aligned and merged into a medical data record set. Medical data records can be displayed in real-time, reviewed for display, or exported to other devices or systems. Whether the timestamps of medical data are aligned can be determined as follows. The medical devices are preset to transmit the medical data at a same time interval. If the central station receives different timestamps of medical data transmitted by multiple different medical devices at the same time, it can be determined that the timestamps of medical data are not aligned. The alignment method can include: a timestamp of one certain type of medical device as a reference timestamp, and adjusting timestamps of medical data transmitted by other types of medical devices to the reference timestamp; or uniformly modifying timestamps of medical data transmitted by each medical device to a timepoint at which the central station receives the medical data.

Furthermore, medical staff can review the aligned and stored medical data records. Specifically, the user can enter a medical data review instruction for any one device group, and the central station determines the device group indicated by the instruction and displays the corresponding medical data records for that device group. For example, when a user selects a patient name to review, the central station determines the device group associated with the patient name and displays the medical data records stored based on the device group to the user. It should be noted that the user requests to review the medical data of a certain device group by inputting a medical data review instruction. Since the device group can be bound to patient or patient support, the user can input a patient identifier or patient support identifier, which can generate a medical data review instruction, and the patient identifier or patient support identifier can be included in the instruction, the central station determines the device group that user wants to review based on the patient identifier or patient support identifier.

To avoid alignment operations on medical data as much as possible, the clock signals of medical devices can be adjusted to synchronize, so that the timestamps of medical data transmitted by medical devices to the central station are as uniform as possible. Therefore, after establishing communication connection between the medical device and the central station, it can transmit its current time to the central station. The central station determines whether there is a time difference between the current time of the medical device and its own time is greater than a preset threshold. If so, the central station can synchronize its own clock with the medical device which is in communication connection with it, so that the medical device generates a timestamp of medical data based on the synchronized clock. Each medical device are synchronized to the clock of the central station, so that the clocks between each medical device are unified, and the timestamps added to the medical data are also aligned. Furthermore, clock calibration between the central station and medical device can be carried out regularly, such as every other month, to detect clock deviations in a timely manner and perform calibration.

Figure 4:
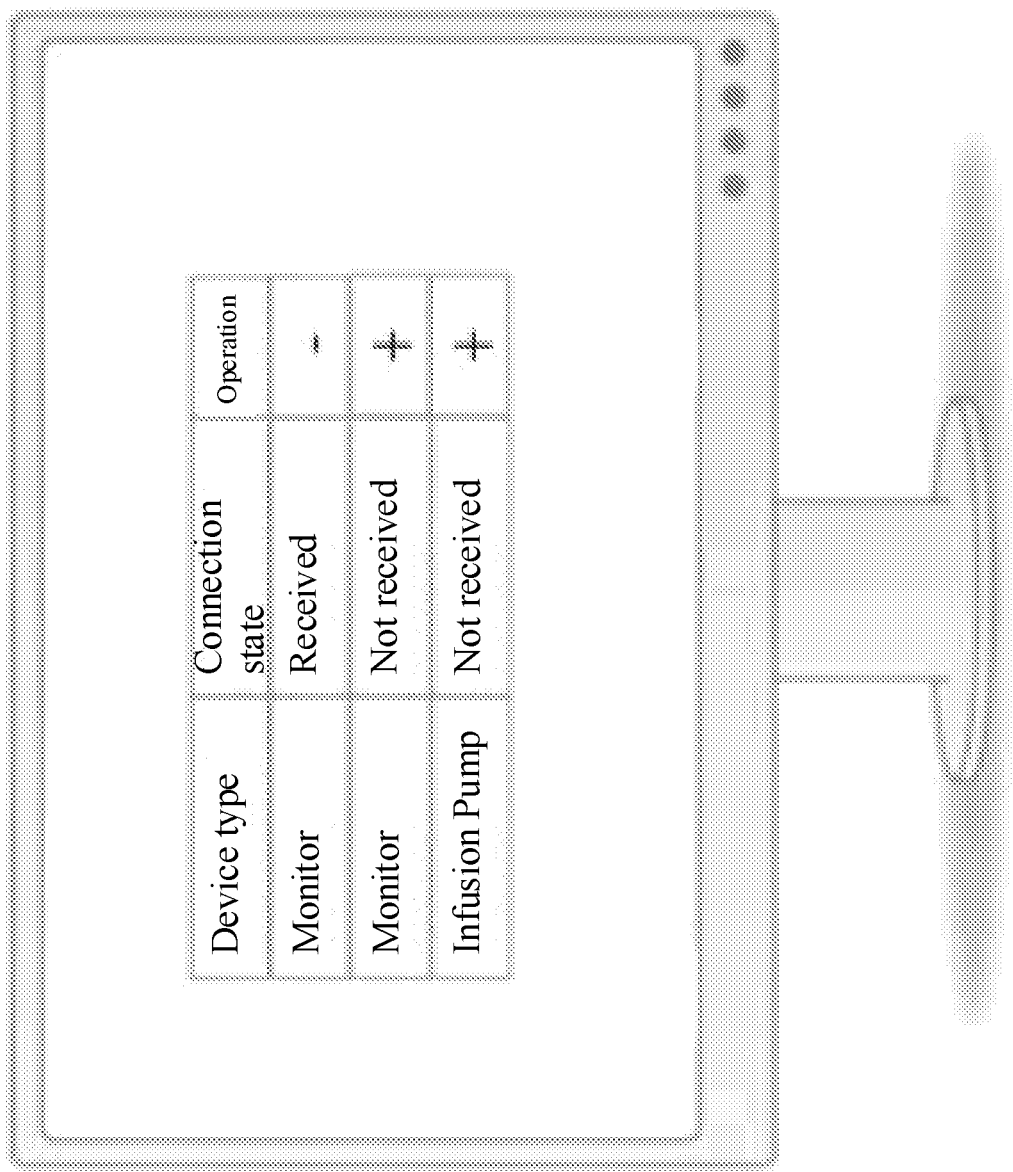
FIG. 4 is a diagram of manually classifying medical devices into groups.

To achieve the purpose of group fusion display in the above embodiments, it is necessary to classify the medical devices into groups. For example, the user can manually classify the medical devices into groups. The central station displays, in a device list, medical devices which are in communication connection with the central station, the user selects one or more medical devices as a device group. Alternatively, the user can manually add or delete medical devices within the device groups that have already been classified. As shown in FIG. 4, the device list displayed at the central station includes two monitors and one infusion pump, with each medical device corresponding to an operation label of "+" or "−". If the user selects the operation label "+" corresponding to a medical device and further enters the identifier of the device group, the medical device can be added to the device group. If the user selects the operation label "−" corresponding to a medical device, the medical device can be deleted from its device group. For example, the central station can automatically classify the medical devices into groups. The central station receives device association information transmitted by medical devices, where the device association information is configured to represent an association relationship between medical devices, which can be specifically reflected as being associated with the same patient or bed, and then classifies at least two medical devices with associated relationship into the same device group based on the device association information. The automatic group division method does not require user operation, thus saving labor costs and improving efficiency of group division.

Correspondingly to the central station, the embodiment of this disclosure provides a medical device management method applied to a medical device, so that the central station can achieve automatic group division of medical devices. It should be noted that in order to distinguish from other medical devices, the medical device applying this method can be referred to as the target medical device. The target medical device can be a monitoring device or other type of medical device.

Specifically, the target medical device acquires the device association information, which is configured to represent the association relationship between the target medical device and other medical devices; wherein a device type of the target medical device is different from that of other medical devices, and at least a monitoring device is included in the target medical device or the other medical devices. The target medical device transmits the device association information to the central station which is in communication connection with the target medical device. The device association information is used by the central station to classify the target medical device and other medical devices into the same device group. It should be noted that the description of association relationship, target medical device, and other medical devices can be found in the above content and is not repeated here.

The following, in conjunction with the system structure provided in this disclosure, specifically explains how the central station classify the medical devices into at least one device group. In this disclosure, the central station is in communication connection with at least two medical devices.

The first group division method is as follows. The central station receives patient support binding information or patient binding information transmitted by at least two medical devices. The patient support binding information represents a patient support which is bound with the medical device, and the patient binding information represents a patient which is bound with the medical device. The medical devices which are bound to the same patient support are determined as a same device group, according to the patient support binding information of the at least two medical devices. Alternatively, the medical devices which are bound to the same patient are determined as a same device group, according to the patient binding information of the at least two medical devices.

In this group division method, the medical device transmits patient support binding information to the central station to inform the central station of the patient support associated with the medical device. Therefore, the central station can classify the medical devices associated with the same patient support into the same device group based on the patient support binding information. It can be seen that the patient support binding information can be considered as device association information that can represent the association relationship between medical devices. If the medical device transmits patient binding information to the central station, the group division is implemented in the same way.

It can be understood that before medical devices transmit the patient support binding information or patient binding information, they need to set the patient support or patient they are bound to. The setting methods include, but are not limited to, manual input by the user, automatic setting by scanning the patient support code or patient code, user selection of settings in a patient support list or patient list, and so on. The specific instructions for setting device association information are as follows.

Figure 5:
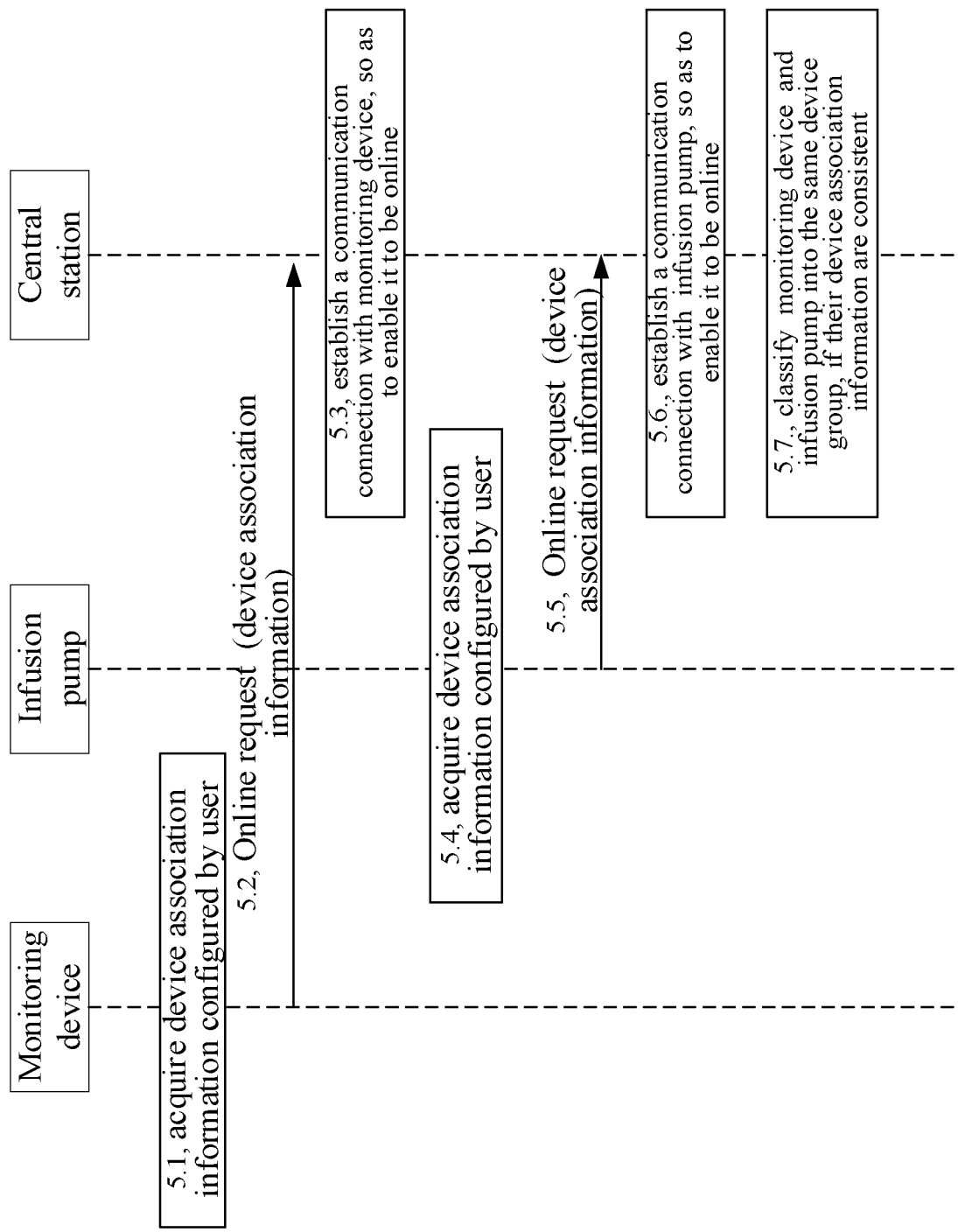
FIG. 5 is a flowchart of a method for classifying medical devices into groups, by a central station.

As shown in FIG. 5, the central station can communicatively connect with medical devices, such as monitoring device and infusion pump. The process of classifying the medical devices into groups by the central station includes steps 5.1 to 5.7.

In step 5.1, the monitoring device acquires device association information which is configured by a user.

Wherein, the device association information includes patient binding information or patient support binding information. Medical staff can manually configure device association information for the monitoring device, such as inputting the device association information to the monitoring device through various methods, such as keyboards, touch screens, and physical buttons. For example, the monitoring device can provide patient or patient support selection options, and medical staff can select a patient or patient support as the device association information for the monitoring device. For example, the monitoring device can scan a patient identifier code or patient support identifier code, such as one-dimensional code, two-dimensional code, etc., and extract patient identifier from the patient identifier code as the patient binding information or extract patient support identifier from the patient support identifier code as the patient support binding information.

If the patient supports, which are associated with the medical devices belong to different departments and rooms, the patient support binding information can specifically include department information, room information, and patient support information for distinguishing. For example, certain patient support binding information is ICU room 01 patient support 01, to clarify that the patient support is the patient support 01 in ICU room 01. Of course, the patient support binding information can also include other information according to actual requirements, and this disclosure does not have specific limitations.

In step 5.2, the monitoring device transmits an online request to the central station, which online request carries the device association information.

Wherein, the monitoring devices can transmit the online request to the central station to establish communication connection with the central station. A specific example of online request is device discovery packet. The online request can be transmitted through various methods, such as broadcast, unicast, multicast, etc.

In step 5.3, after receiving the online request from the monitoring device, the central station establishes communication connection with the monitoring device, so as to enable it to be online.

After receiving the online request, the central station sets the monitoring device to an online state according to a preset online rule and establishes communication connection with the monitoring device. This communication connection is configured to transmit communication data between the central station and the monitoring device, for example, the monitoring device transmits medical data of its associated patient to the central station.

In step 5.4, the infusion pump acquires device association information, which is configured by the user.

Wherein, the device association information includes patient binding information or patient support binding information.

In step 5.5, the infusion pump transmits an online request to the central station, which carries the device association information.

In step 5.6, after receiving the online request from the infusion pump, the central station establishes communication connection with the infusion pump, so as to enable it to be online. Wherein, the online process of the infusion pump can be referred to the monitoring device, and it is not elaborated here. It should be noted that the order in which the monitoring device and infusion pump are online is not limited to this, and can also be online simultaneously or the infusion pump can be online first, and then the monitoring device is online. It is understandable that, if the monitoring device and infusion pump serve the same patient support or patient, the patient support binding information or the patient binding information in the online request transmitted by the monitoring device and infusion pump is the same.

In step 5.7, if the association relationship information between the monitoring device and the infusion pump is consistent, the central station classifies the monitoring device and the infusion pump into the same device group.

Wherein, the central station determines whether the device association information of the monitoring device is consistent with the device association information of the infusion pump based on the received device association information (such as binding to the same patient support or patient). If so, the monitoring device and the infusion pump are classified into the same device group. If the monitoring device and infusion pump are classified into the same device group and the device group is generated for the first time, a group identifier of the device group can be obtained based on the device association information. The group identifier can be a patient support or patient associated with the monitoring device or infusion pump. If the monitoring device or infusion pump is classified into the device group that has already been generated before, the monitoring device or the infusion pump is added to the same device group. For example, if there is already a device group with a group identifier as ICU patient support 01, and the device association information between the monitoring device and the infusion pump is ICU patient support 01, then the monitoring device and infusion pump are added to the device group ICU patient support 01.

In this group division method, the central station extracts the device association information from the online requests transmitted by the medical devices, and then classifies the medical devices into the device groups according to the device association information. It should be noted that the online request is usually transmitted before the communication connection between the medical device and the central station is established. Of course, the medical device can also not transmit the device association information by including it in the online request, but transmit the device association information at any time after the communication connection is established, and the device association information can be transmitted for multiple times at fixed periods.

The device association information in the above group division method is independently transmitted by each medical device, but in practical applications, there may be situations where the device association information of certain medical devices is transmitted to the central station by other medical device. For example, some medical devices may not be arranged with input modules, and medical staff may not be able to configure device association information for these medical devices. Alternatively, medical devices, such as monitoring devices, are typically used as primary medical devices to serve patients. When additional medical devices need to be added to the patient, the primary medical device can be associated with other medical device for use. At this time, the associated information between the primary medical device and other medical device can be transmitted through the primary medical device. In response to the above situation, this disclosure provides the following second group division method.

The second group division method is that the central station receives device association information transmitted by the online medical device, wherein the device association information is configured to indicate other medical device(s), which is(are) associated with the online medical device. The online medical device refers to any one of the at least two medical devices. When the other medical device(s) is(are) online, the other medical device(s) is(are) determined as belonging to a device group to which the online medical device belongs.

In this group division method, if any one medical device of the medical devices, which are in communication connection with the central station, is online or request to be online from the central station side, the medical device can be referred to as an online medical device. The online medical device can establish an association relationship with other medical devices. Unlike the first group division method, the device association information in this group division method represents the association relationship between medical devices, specifically the association relationship between the online medical device and other medical device(s). From the perspective of medical device side, one specific way for the online medical device to obtain the device association information is to obtain a device identifier of the online medical device and device identifier(s) of other medical device(s); and to associate the device identifier of the online medical device with the device identifier(s) of the other medical device(s) to obtain the device association information. More specifically, the online medical device can obtain the device identifier of the other medical device through any of the following methods: receiving the device identifier of the other medical device, which is inputted by the user; displaying a device identifier of at least one medical device, and determining a device identifier which is selected by the user as the device identifier of the other medical device, in response to a selection operation for the device identifier from at least one device identifier; or acquiring the device identifier of the other medical device through a code scanning device.

The central station classifies the other medical devices into device groups which the online medical devices belong to, based on their associated information. It should be noted that the online medical device can be classified into a device group which corresponds to a patient or patient support which is associated with the online medical device. Of course, if the corresponding device group for the patient or patient support is not found, a device group can be established to classify the online medical device into this device group. The group identifier of the established device group can be determined according to the patient or patient support, which is associated with the online medical device, that is, the patient or patient support associated with the online medical device can be determined as the group identifier of the device group. That is, the patient support or patient, which is associated with the device group to which the online medical device belongs to, is the patient support or patient, which is associated with the online medical device.

It should be noted that online medical devices can monitor devices or other types of medical devices. In addition, online time of the other medical device can be before or after online time of the online medical device. That is to say, the other medical devices, which are indicated by the device association information transmitted by the online medical device, can be the medical devices that were online before or to be online after the online medical device. In addition, the device association information can be transmitted simultaneously with or after the online request of the medical device.

Figure 6:
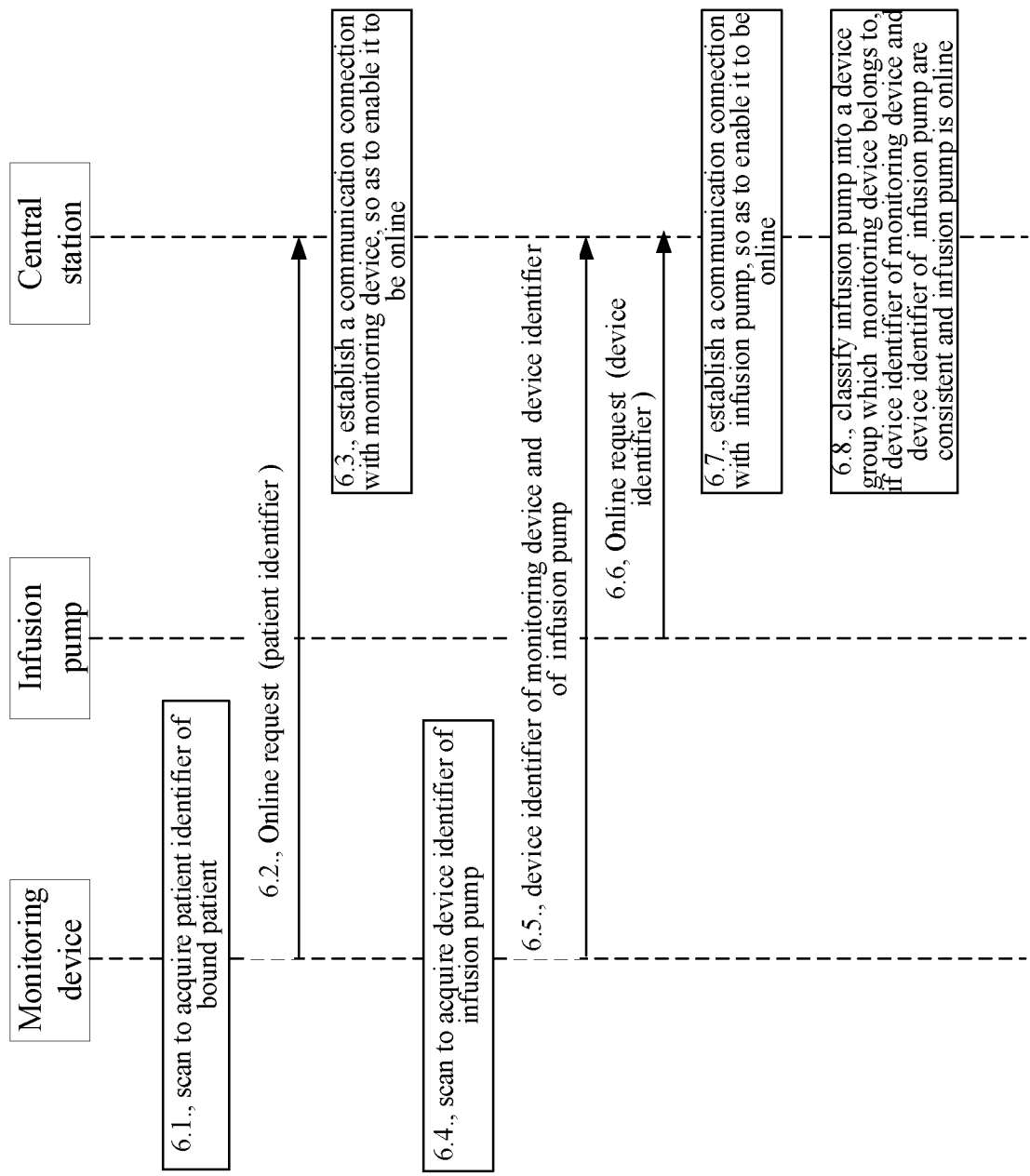
FIG. 6 is a flowchart of another method for classifying medical devices into groups, by a central station.

A detailed explanation of this group division method is provided based on an example in FIG. 6. The central station can communicatively connect with the medical device, such as monitoring device and infusion pump. This group division method for medical devices specifically includes steps 6.1 to 6.8.

In step 6.1, the monitoring device scans to acquire a patient identifier of a bound patient. Wherein, when the monitoring device serves a certain patient, the monitoring device can be fixed next to the patient support of the patient. The monitoring device can be equipped with a scanning device, such as a wireless scanning gun or a wired scanning gun, which can obtain the patient identifier through scanning and use the patient identifier as patient binding information. Patient identifier can be recorded in a patient identifier code, such as a patient wristband, and a patient support identifier can be recorded in a patient support identifier code, such as a one-dimensional code and a two-dimensional code.

In step 6.2, the monitoring device transmits an online request to the central station, which online request carries the patient identifier.

In step 6.3, after receiving the online request from the monitoring device, the central station establishes communication connection with the monitoring device.

The online process of the monitoring device can be explained in FIG. 5 and is not elaborated here. The patient identifier transmitted by the monitoring device can be outputted and displayed by the central station.

In step 6.4, the monitoring device scans to acquire a device identifier of an infusion pump.

Wherein, if the patient associated with the monitoring device needs to use an infusion pump, medical staff can acquire idle infusion pump to serve the patient. A device housing of the infusion pump can be pasted with a paper identifier code, or a display screen can display an electronic identifier code. Medical staff operate the scanning device of the monitoring device to scan the identifier code of the infusion pump, so as to identify the device identifier of the infusion pump. It should be noted that scanning the device identifier of the infusion pump by the monitoring device can be considered as an association operation, that is, the monitoring device establishes an association relationship between the infusion pump and itself.

In step 6.5, the monitoring device transmits its own device identifier and the device identifier of the infusion pump to the central station.

Wherein, the monitoring device transmits the scanned device identifier of the infusion pump to the central station to inform the central station that the monitoring device has an association relationship with the infusion pump which corresponds to the device identifier. It can be understood that the monitoring device transmits its own device identifier when transmitting the device identifier of the infusion pump. The device association relationship is specifically reflected in the form of device identifier pairs, such as the monitoring device identifier—infusion pump identifier.

In step S6.6, the infusion pump transmits an online request to the central station, which online request carries the device identifier of the infusion pump.

Wherein, if the infusion pump has not established communication connection with the central station, the infusion pump can transmit an online request to the central station. Of course, if the infusion pump is already online on one side of the central station, this step can be omitted and the online infusion pump can be directly determined as belonging to the device group to which the monitoring device belongs.

In step S6.7, the central station establishes communication connection with the infusion pump to enable it to be online, after receiving the online request from the infusion pump.

In step S6.8, if the device identifier of the infusion pump is consistent with the device identifier transmitted by the monitoring device and the infusion pump is online, the central station classifies the infusion pump into a device group which the monitoring device belongs to.

After receiving the device identifier transmitted by the monitoring device, the central station first determines whether the medical device corresponding to the device identifier is online. If so, the medical device corresponding to the device identifier is directly determined as belonging to the device group to which the monitoring device belongs. If not, the device identifier in each online request is compared with the device identifier transmitted by the monitoring device. If matches, the medical device corresponding to the online request is determined as belonging to the device group to which the monitoring device belongs.

It should be noted that the patient identifier mentioned above can be replaced with the patient support identifier, which means that the medical device uses the patient support identifier as the device binding information. In addition, the infusion pump is only an example, and according to the actual application situation, it can be any type of medical device other than monitoring devices, such as ventilators, anesthesia machines, and others.

In the above group division method, the device association relationship transmitted by the online medical device is the association relationship between device identifiers, so that the central station classifies the associated medical devices into the same device group according to the device identifier. This disclosure provides another group division method, in which the online medical device can transmit patient identifier associated with other medical device, the central station classifies the other medical device with consistent patient identifier into the device group which the online medical device belongs to, according to the patient identifiers associated with the monitoring device and associated with other medical device.

That is, the third group division method is as follows. The central station receives device association information transmitted by the online medical device, wherein the device association information is configured to indicate the patient associated with the other medical device. The online medical device refers to any one of the at least two medical devices. If the patient associated with the online medical device is the same as that associated with the other medical device, the other medical device is determined as belonging to the device group which the online medical device belongs. From the perspective of the online medical device, the online medical device can acquire device association information, specifically patient identifier associated with the target medical device and associated with other medical device associated patient identifiers, as the device association information; or acquiring patient support identifiers associated with the target medical device and associated with other medical device, as the device association information.

Figure 7:
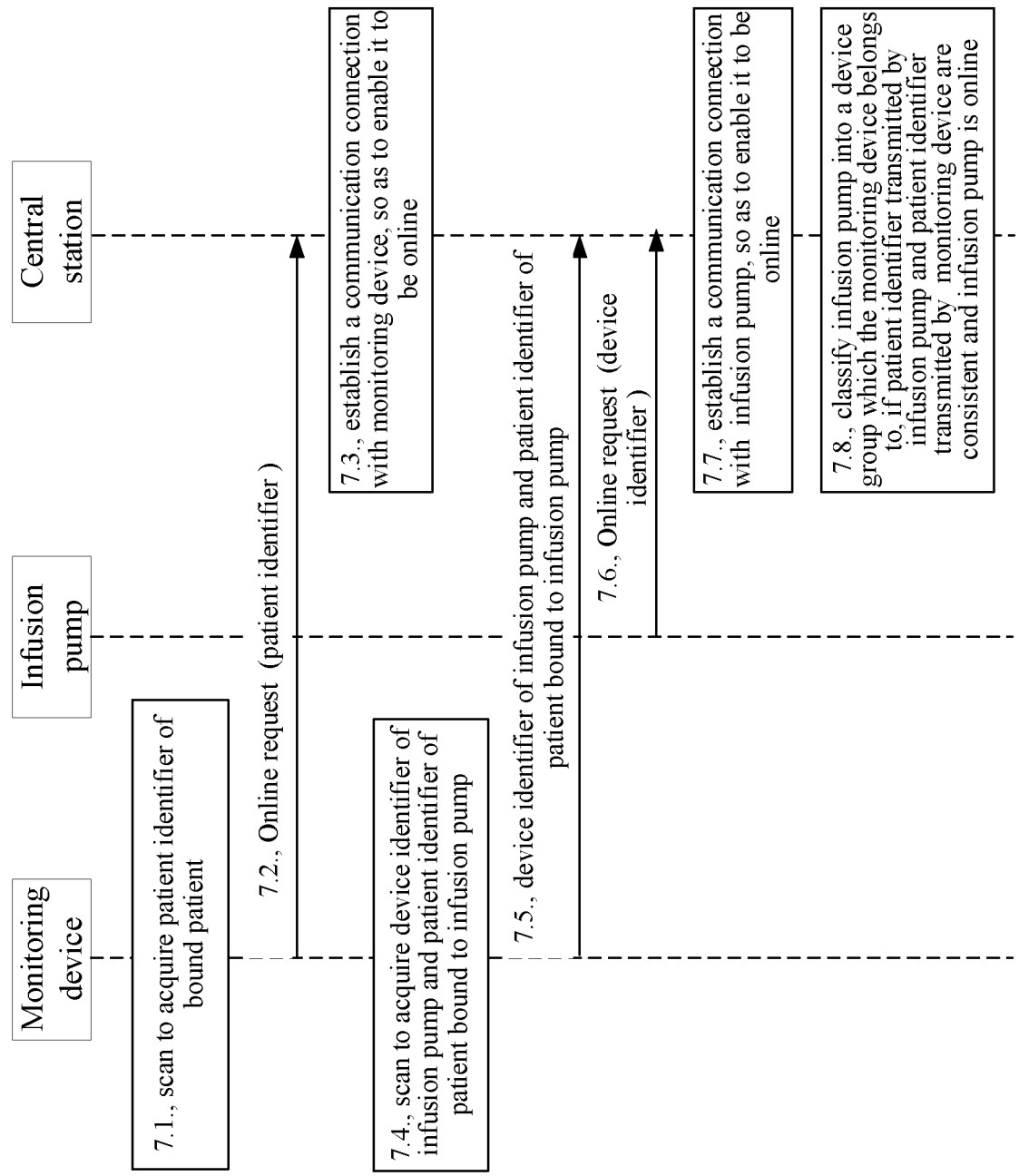
FIG. 7 is a flowchart of a further method for classifying medical devices into groups, by a central station.

A detailed explanation of this group division method is provided based on an example in FIG. 7. As shown in FIG. 7, the central station can communicatively connect with the medical device, such as monitoring device and infusion pump. This medical group division method of medical devices specifically includes steps 7.1-7.8.

In step 7.1, the monitoring device scans to acquire a patient identifier of a bound patient.

In step 7.2, the monitoring device transmits an online request to the central station, which online request carries the patient identifier.

In step 7.3, after receiving the online request from the monitoring device, the central station establishes communication connection with the monitoring device.

In step 7.4, the monitoring device scans to acquire a device identifier of an infusion pump, and a patient identifier of a patient who is bound to the infusion pump.

Unlike step 6.4, the monitoring device not only scans the device identifier of the infusion pump when associating with the infusion pump, but also needs to scan the patient identifier of the patient served by the infusion pump. If the infusion pump and the monitoring device serve the same patient, in order to simplify the operation steps, the monitoring device can directly use the scanned patient identifier as the patient identifier of the patient bound to the infusion pump, provided that the patient identifier has been scanned in step 7.1.

In step 7.5, the monitoring device transmits the device identifier of the infusion pump and the patient identifier of the patient bound to the infusion pump to the central station.

Unlike step 6.5, the monitoring device may not transmit its own device identifier when performing this step.

In step S7.6, the infusion pump transmits an online request to the central station, which online request carries the device identifier of the infusion pump.

In step S7.7, the central station establishes communication connection with the infusion pump to enable it to be online, after receiving the online request from the infusion pump.

Wherein, the establishment of communication connection between the central station and the infusion pump indicates that the infusion pump is online on the side of the central station.

In step S7.8, if the patient identifier transmitted by the infusion pump is consistent with the patient identifier transmitted by the monitoring device and the infusion pump is online, the central station classifies the infusion pump into a device group which the monitoring device belongs to.

Wherein, the patient identifier bound to the infusion pump is transmitted by the monitoring device to the central station, which receives the patient identifier bound to the infusion pump and the patient identifier bound to the monitoring device. Based on the identity of the patient identifiers, the infusion pump is classified into the device group to which the monitoring device belongs. It can be seen that this group division method achieves the group division according to the patient identifier.

It should be noted that the explanation for steps 7.1 to 7.3, 7.6, and 7.7 can be found in FIG. 6, and are not repeated here. The above patient identifier can be replaced with a patient support identifier, which means that the medical device uses the patient support identifier as device binding information. In addition, the infusion pump is only an example, and according to the actual application situation, it can be any type of medical device other than monitoring device, such as ventilators, anesthesia machines, and others.

In the above group division methods of medical devices, the device association information is transmitted by the medical device to the central station. In practical applications, medical device, such as monitoring device, may not have scanning function, and can upload device association information through a terminal device, such as a mobile phone, tablet, etc. that can communicate with the central station.

That is, the fourth group division method is as follows. The central station receives multiple device association information transmitted by a terminal device, where different device association information indicates patients associated with different medical devices. The central station classifies medical devices associated with the same patient into the same device group according to the device association information.

Correspondingly to the central station, the embodiment of this disclosure provides a medical device management method applied to a terminal device. The terminal device acquires device association information, wherein different device association information indicates patients who are associated with different medical devices; wherein the different medical devices includes at least two types of medical devices, and one medical device of the at least two types of medical devices, is a monitoring device. The device association information is transmitted to a central station which is in communication connection with a target medical device, wherein the device association information is for the central station to classify medical devices which are associated with a same patient into a same device group. The device association information can specifically include a device identifier of the medical device and a patient identifier of a patient bound to the medical device. The device association information can be acquired through any of the following methods by the terminal device, such as scanning through the scanning device, entering through the input device, and so on. Specifically, the terminal device can receive the device identifier of the medical device inputted by the user and the patient identifier of the patient bound to the medical device. Alternatively, the terminal device can display the device identifier of at least one medical device and at least one patient identifier, and acquire the selected device identifier and patient identifier by the user, in response to a selection operation of the user. Alternatively, the terminal device can acquire the device identifier of the medical device and the patient identifier of the patient bound to the medical device, by the code scanning device.

It should be noted that in this group division method, the terminal device needs to establish communication connection with the central station, but the communication network on which the terminal device relies for communication connection with the central station can be different from the medical device. For example, the terminal device connects to the central station through a regular network, while medical device connects to the central station through a specialized medical network. The terminal device can acquire device association information for each medical device, such as device identifier and patient identifier. Device association information is configured to represent patients associated with medical devices. The central station uses the patient identifier as the association basis, so as to classify the medical devices associated with the same patient into the same device group.

Figure 8:
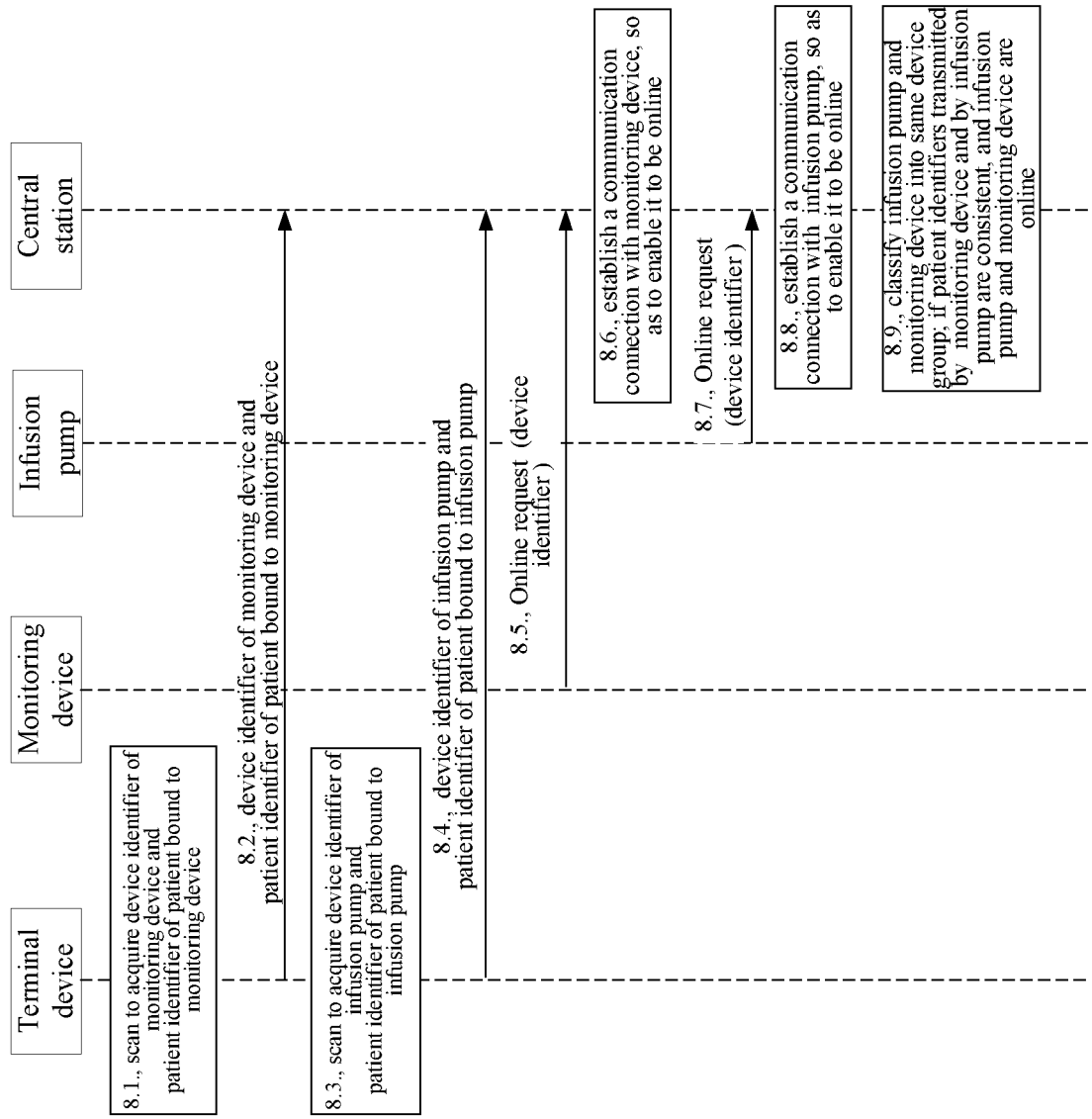
FIG. 8 is a flowchart of another further method for classifying medical devices into groups, by a central station.

A detailed explanation of this group division method is provided based on an example in FIG. 8. As shown in FIG. 8, the central station can communicatively connect with the medical device, such as monitoring device and infusion pump, and the terminal device can also establish communication connection with the central station. This medical group division method of medical devices specifically includes steps 8.1 to 8.9.

In step 8.1, the terminal device scans to acquire a device identifier of monitoring device and a patient identifier of a patient who is bound to the monitoring device.

Wherein the terminal device, such as mobile phone, can install management applications related to the central station, start the management application to revoke a canning module, so as to use the scanning module to scan for acquiring the device identifier and patient identifier. The explanation for the patient identifier and device identifier, can refer to the above instructions and is not elaborated here.

In step 8.2, the terminal device transmits the device identifier of the monitoring device and the patient identifier of the patient who is bound to the monitoring device to the central station.

Wherein, the terminal device can transmit the device identifier and patient identifier in the form of identifier pairs, such as device identifier-patient identifier, to the central station. The identifier pair represents that the medical device corresponding to the device identifier is bound to the patient corresponding to the patient identifier.

In step 8.3, the terminal device scans a device identifier of an infusion pump and a patient identifier of a patient, who is bound to the infusion pump.

In step 8.4, the terminal device transmits the device identifier of the infusion pump and the patient identifier of the patient who is bound to the infusion pump to the central station.

It should be noted that the scanning sequence of the monitoring device and infusion pump by the terminal device is not limited to this, but can also be other.

In step 8.5, the monitoring device transmits an online request to the central station, which online request carries the device identifier of the monitoring device.

In step 8.6, after receiving the online request from the monitoring device, the central station establishes communication connection with the monitoring device to enable it to be online.

In step 8.7, the infusion pump transmits an online request to the central station, which online request carries a device identifier of the infusion pump.

In step 8.8, after receiving the online request from the infusion pump, the central station establishes communication connection with the infusion pump to enable it to be online.

It should be noted that the online sequence of monitoring device and infusion pumps is not limited to this, but can also be other.

In step 8.9, if the patient identifier transmitted by the infusion pump is consistent with the patient identifier transmitted by the monitoring device, and both the infusion pump and monitoring device are online, the central station classifies the infusion pump and monitoring device into the same device group.

Specifically, after a new medical device is online, the central station can determine whether the patient who is bound to the newly online medical device, is the same as the one who is bound to an already online medical device. If yes, the newly online medical device and the already online medical device are classified into the same device group.

Unlike the aforementioned group division methods, this group division method requires the use of terminal device to upload patient identifier associated with each medical device, and the central station classifies the medical devices according to the consistency of patient identifiers. Alternatively, the terminal device can directly establish associations between medical devices and transmit them to the central station without scanning patient identifiers.

That is, the fifth group division method is as follows. The central station receives device association information transmitted by a terminal device, which device association information carries multiple medical device identifiers. The central station classifies the multiple medical devices, which are represented by the multiple medical device identifiers into the same device group.

Specifically, the terminal device can acquire device identifiers from multiple medical devices. For example, the medical staff input device identifiers of multiple medical devices to the terminal device. Acquiring multiple medical device identifiers indicates that there is an association relationship between the multiple medical devices corresponding to the multiple medical device identifiers. The central station can classify the corresponding medical devices into the same device group based on the multiple medical device identifiers. This group division method can have good application effects in situations where terminal device cannot directly acquire the patient identifier. For example, if a patient has not yet been assigned with a patient identifier, the monitoring device and other types of medical device, serving the patient, can be associated first. After the monitoring device scans the patient identifier, the complete set of associated medical devices can be directly used. Of course, this situation is only an example, and this group division method can also be applied to other situations where medical devices do not need to be scanned for patient identifier.

Figure 9:
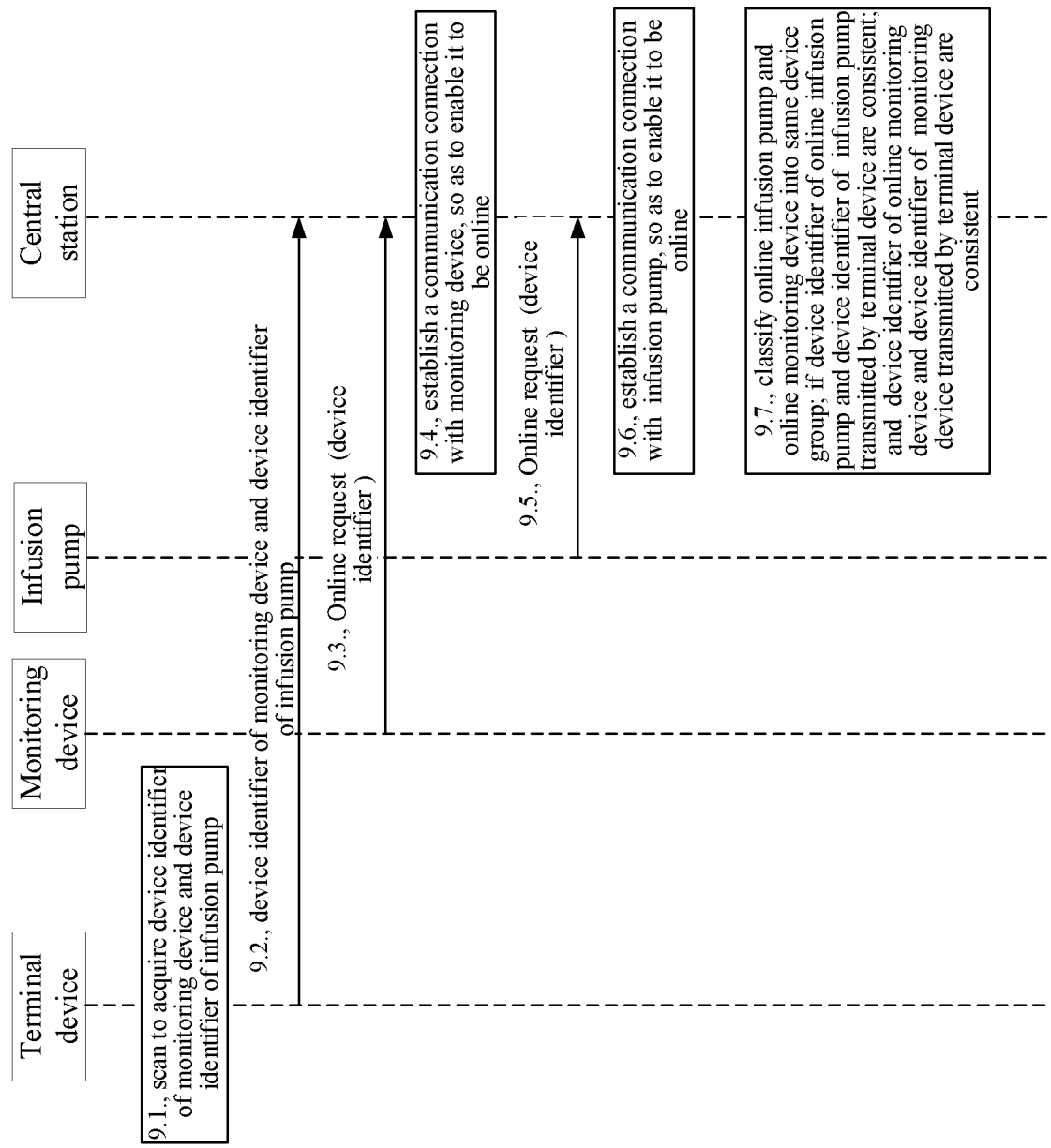
FIG. 9 is a flowchart of yet another further method for classifying medical devices into groups, by a central station.

A detailed explanation of this group division method is provided based on an example in FIG. 9. As shown in FIG. 9, the central station can communicatively connect with the medical devices, such as monitoring device and infusion pump, and the terminal device can also establish communication connection with the central station. This medical group division method of medical devices specifically includes steps 9.1 to 9.7.

In step 9.1, the terminal device scans to acquire a device identifier of monitoring device and a device identifier of an infusion pump.

In step 9.2, the terminal device transmits to the central station an association relationship between the device identifier of the monitoring device and the device identifier of the infusion pump.

The terminal device can transmit the device identifiers through identifier pairs, such as device identifier of the monitoring device-device identifier of the infusion pump. The identifier pair of device identifiers can be considered as a specific form of device association information, which is configured to represent the binding relationship between the corresponding medical devices of the identifier pair. It should be noted that the medical devices scanned by the terminal device are not limited to two, but can also be more, so the device identifiers of the included devices is not limited to two, but can also be multiple.

In step 9.3, the monitoring device transmits an online request to the central station, which online request carries the device identifier of the monitoring device.

In step 9.4, after receiving the online request from the monitoring device, the central station establishes communication connection with the monitoring device to enable it to be online.

In step 9.5, the infusion pump transmits an online request to the central station, which online request carries the device identifier of the infusion pump.

In step 9.6, after receiving the online request from the infusion pump, the central station establishes communication connection with the infusion pump to enable it to be online.

The explanation for steps 9.1 to 9.6 can be found in the above explanations and is not repeated here.

In step 9.7, if the device identifier of the online infusion pump is consistent with the device identifier of the infusion pump transmitted by the terminal device, and the device identifier of the online monitoring device is consistent with the device identifier of the monitoring device transmitted by the terminal device, the central station classifies the online infusion pump and the online monitoring device into the same device group.

After receiving the association relationship between the device identifier of the monitoring device and the device identifier of the infusion pump, which are transmitted by the terminal device, the central station can determine that there is an association relationship between the monitoring device and the infusion pump. When the infusion pump is online and the monitoring device is online, the infusion pump and the monitoring device can be classified into the same device group.

It should be noted that among the various methods of device division mentioned above, the central station only classifies the medical devices into device groups after they are online. Of course, when the central station receives the device association information, the medical device may not have been online. Therefore, the central station can also directly classify the medical devices into device groups according to the device association information. After the medical device is online from the central station side, it can directly determine the device group to which the online medical device belongs. The purpose of determining the device group to which medical devices belong is to display medical data acquired by the medical devices within the same device group in the same area.

In practical applications, there may be situations where switching to the same type of medical device occurs, that is, a medical device bound to a patient or patient support, is switched to other medical device of the same type. For example, if a patient is seriously ill and treated in a ward, an invasive ventilator may be used. When it is necessary to go out for examination, the invasive ventilator may be switched to a transport ventilator. When the ill condition improves, the invasive ventilator can be switched to a non-invasive ventilator. It can be seen that the type of medical device bound to the same patient may need to be replaced for different reasons, in which case the central station needs to adjust the display content of the patient monitoring interface. Therefore, on the basis of any embodiment of the medical device management method mentioned above, the following steps can also be included.

If detecting that a medical device, which is associated with the device group to be switched, is online and detecting that a device type of the online medical device is same as that of a medical device to be switched in the device group to be switched, medical data of the medical device to be switched, which is displayed in the display area, is switched to medical data of the online medical device. The device group to be switched is any one device group of the at least one device group, and the medical device to be switched is any one medical device in the device group to be switched.

Specifically, after the medical device is online on one side of the central station, the central station can associate the online medical device with a certain device group according to any of the achievable group division methods of medical devices mentioned above. Generally speaking, the same type of medical device associated with the same patient support or patient includes just one medical device. If the online medical device has the same device type as a medical device within its device group, it indicates that the patient or patient support needs to switch from the medical device to other medical device of the same type. Therefore, after the central station associates the online medical device with a certain device group, it can further determine whether the device type of the online medical device is the same as that of a certain medical device within the device group. If a certain medical device of this device type is found, the medical data of that certain medical device in the patient monitoring interface is switched to the medical data of the online medical device. For the convenience of description, the medical device found in the medical device group can be referred to as the medical device to be switched, and the device group which the medical device belongs to (i.e., the device group associated with the online medical device) can be referred to as the device group to be switched. It should be noted that the medical devices to be switched and the online medical devices can be identical medical devices or medical devices of different subcategories included in the same category.

Furthermore, the online medical device does not necessarily immediately transmit medical data. For example, if medical staff want to replace the medical device A associated with the patient with the same type of medical device B, they may first operate the medical device B to go online from the central station side, and then apply the medical device to the patient to acquire the medical data related to the patient and transmit it to the central station. At this time, the binding of medical device A may not have been released. At this point, if the central station switches from the medical data of medical device A to medical data of medical device B, it may cause the medical data on the patient monitoring interface displayed by the central station to be blank. In order to avoid this situation and ensure the continuity of medical data display in the patient monitoring interface, switching conditions can be added, that is, the central station detects that the medical device associated with the device group to be switched is online, the online medical device and the device type of the medical device to be switched in the device group to be switched are the same, and receives the medical data transmitted by the online medical device, and then switches on the patient monitoring interface.

Figure 10:
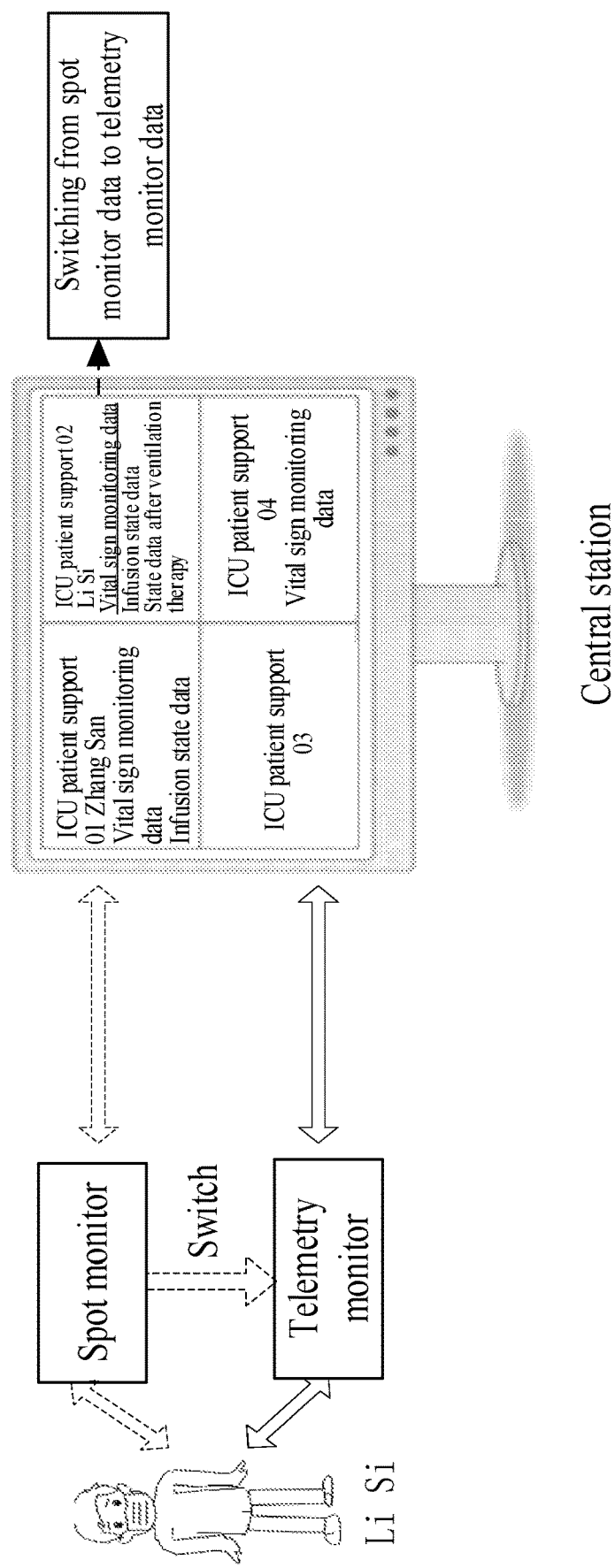
FIG. 10 is a situation diagram for switching medical devices.

As shown in FIG. 10, an example is provided, in which a spot monitor associated with the patient is replaced by a telemetry monitor. After the telemetry monitor is online from the central station side and the central station receives the medical data acquired by the telemetry monitor, the central station no longer displays the medical data acquired by the spot monitor, but switches to display the medical data acquired by the telemetry monitor. The medical data acquired by the sport monitoring device can be referred to as spot medical data, while the medical data acquired by telemetry monitoring devices can be referred to as telemetry medical data.

Patient can switch to different medical devices for usage, but for the same patient, working parameter information of the medical devices before and after switching may be the same. Therefore, on the basis of the above embodiments, the central station can also automatically configure working parameters of the switched medical device through the following method. The central station transmits the working parameters of the medical device to be switched to the online medical device, so that the online medical device synchronizes its working parameters to those of the medical device to be switched.

Specifically, the medical device can transmit its own working parameters to the central station, and the transmission time includes but is not limited to when medical data cannot be acquired from the patient during the online process on the central station side, and when medical staff instruct to transmit the working parameters. After receiving the working parameters transmitted by the medical device, the central station can record and store them.

When a medical device is switched to a newly online medical device of the same type, the central station can transmit the working parameters of the medical device to the online medical device, so that the online medical device can configure itself based on the working parameters of that medical device. For example, when a patient uses an invasive ventilator, if the central station determines that the patient is first associated with a ventilator, the ventilation configuration of the invasive ventilator can be recorded. When the patient switches to another ventilator, such as a transport ventilator or non-invasive ventilator, the ventilation configuration of the invasive ventilator is transmitted to that another ventilator. This embodiment can automatically synchronize and configure the working parameters of the medical device after switching, simplifying the operation of medical staff and improving the device experience of the user.

The use position of medical device is not fixed. When a patient or patient support has finished using a certain medical device, the medical device can be released from the binding relationship with the patient or patient support for use by other patients or patient supports. Therefore, any of the above embodiments can also include: if the central station receives a termination request for the medical device to be switched, it deletes the medical device to be switched from the device group which the medical device belongs to.

Specifically, switching medical devices for patient indicates that the binding between the patient support and the medical device is terminated. One way for terminating the binding is as follows. The medical staff operate the medical device to terminate the binding. The medical device transmits a termination request to the central station, which receives the termination request and deletes the medical device from its device group. Moreover, the medical device can clear relevant information about the patient from its own devices. Another way for terminating the binding is as follows. The medical staff input a termination instruction (termination request) to the central station to unbind the medical device from the patient. After receiving the termination instruction, the central station deletes the medical device from its device group. In addition, the central station can transmit an instruction to the medical device to clear the patient related information of the bound patient.

Figure 11:
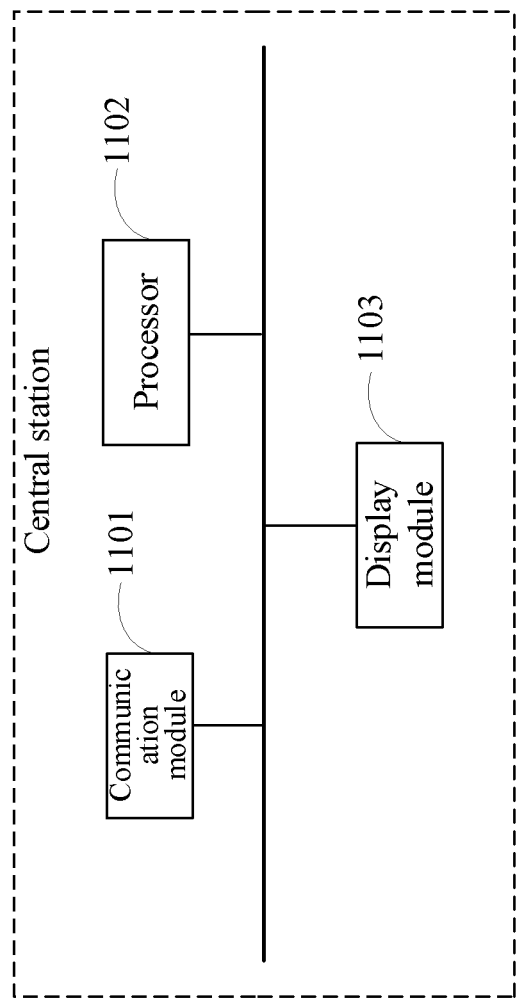
FIG. 11 is a structural diagram of a central station.

To ensure the practical application and implementation of the above method embodiments, the embodiment of this disclosure also provides a central station. As shown in FIG. 11, the central station can include a communication module 1101, a processor 1102, and a display module 1103.

The communication module 1101 is in communication connection with at least two medical devices; wherein medical devices of two different types in the at least two medical devices are respectively communicated with the central station through different channels, and one medical device of the medical devices of two different types is a monitoring device.

The processor 1102 is configured to receive medical data, which is transmitted by a target medical device, and determine a target device group, which corresponds to the target medical device, from at least one device group; wherein the target medical device is any one medical device of the at least two medical devices, and the at least two medical devices includes at least two types of medical devices; the device group consists of medical devices with an association relationship, from the at least two medical devices.

The display module 1103 is configured to display the medical data from the target medical device, in a display area on a patient monitoring interface of the central station, which display area corresponds to the target device group; wherein different display areas correspond to different device groups, and one display area is configured to display medical data from a monitoring device and medical data from at least one medical device which has a different type from the monitoring device, wherein said monitoring device and the at least one medical device are within a corresponding device group.

In one embodiment, the central station can be specifically a server and a workstation, wherein the server integrates the communication module 1101 and processor 1102 achieve the functions of these two modules, and the workstation integrates the display module 1103 for information presentation. One server can correspond to multiple workstations, while one workstation can also correspond to multiple servers. For example, if an electrocardiogram expert is responsible for critically ill patients in multiple departments, the workstation of the electrocardiogram expert can be connected with servers in multiple different departments.

In one embodiment, the processor is further configured to determine target viewing device group(s), which is(are) associated with a target medical institution, from the at least one device group, in response to a viewing instruction of a user for a medical device in the target medical institution, wherein at least one target viewing device group exists; and determine medical data which corresponds to a same target viewing device group, from medical data which is transmitted by the at least two medical devices; wherein the display module is further configured to display, in display area(s) of the patient monitoring interface, medical data of target viewing device group(s), which correspond(s) to the display area(s).

In one embodiment, the association relationship between the medical devices comprises: the medical devices within a same device group are associated with a same patient support, and/or the medical devices within a same device group are associated with a same patient.

In one embodiment, in order to determine target viewing device group(s), which is (are) associated with a target medical institution, from the at least one device group, the processor is specifically configured to determine a target patient support and/or a target patient, which are/is associated with the target medical institution; and determine device group(s), which is(are) associated with the target patient support and/or the target patient as the target viewing device group(s), which is (are) associated with the target medical institution.

In one embodiment, before the display module is further configured to display, in display area(s) of the patient monitoring interface, medical data of target viewing device group(s), which correspond(s) to the display area(s); the processor is further configured to: determine a user identity, wherein the user identity is configured to indicate data item(s) of medical data that the user expects to view; and determine target medical data, which corresponds to the data item(s), from the medical data, which corresponds to the display area(s) of the patient monitoring interface;

wherein in order to display, in display area(s) of the patient monitoring interface, medical data of target viewing device group(s), which correspond(s) to the display area(s), the display module is specifically configured to: display, in the display area(s) of the patient monitoring interface, the target medical data which corresponds to the display area(s).

In one embodiment, in order to determine a user identity, the processor is specifically configured to receive a customized viewing instruction from the user, wherein the customized viewing instruction carries the user identity; acquire biometric information of the user, and identify the user identity according to the biometric information; or acquire a user identifier from a user information recording carrier and determine the user identity from the user identifier.

In one embodiment, multiple target viewing device groups exist, wherein in order to display, in display area(s) of the patient monitoring interface, medical data of target viewing device group(s), which correspond(s) to the display area(s), the display module is specifically configured to:

display, in multiple display areas of the patient monitoring interface, the medical data, which is transmitted by medical device(s) within the multiple target viewing device groups; wherein said medical data comprises any one or more of: vital sign parameter waveform(s), vital sign parameter value(s), physiological alarm(s), and working parameter(s) of the medical device(s).

In one embodiment, the processor is further configured to align medical data, which is transmitted by medical devices within a same device group, according to timestamp(s) of said medical data, and store the aligned medical data as a medical data record set.

In one embodiment, the display module is further configured to display medical data record(s), which correspond(s) to any one device group, which device group is indicated by a medical data review instruction; when receiving the medical data review instruction for the any one device group.

In one embodiment, the processor is further configured to synchronize a clock of the central station with the at least two medical devices, so as to enable the at least two medical devices to generate timestamps of medical data according to the synchronized clock.

In one embodiment, before to determine a target device group, which corresponds to the target medical device, from at least one device group, the processor is further configured to receive device association information; and classify the medical devices with the association relationship from the at least two medical devices, into a same device group, according to the device association information; wherein the device association information is configured to represent the association relationship between the medical devices.

In one embodiment, in order to receive device association information; and classify the medical devices with the association relationship from the at least two medical devices, into a same device group, according to the device association information, the processor is specifically configured to: receive patient support binding information or patient binding information, which is transmitted by the at least two medical devices, wherein the patient support binding information represents a patient support, which is bound to a medical device of the at least two medical devices, the patient binding information represents a patient, who is bound to a medical device of the at least two medical devices; and determine medical devices, which are bound to a same patient support as belonging to a same device group, according to the patient support binding information of the at least two medical devices; or determine medical devices, which are bound to a same patient as belonging to a same device group, according to the patient binding information of the at least two medical devices.

In one embodiment, in order to receive patient support binding information or patient binding information, which is transmitted by the at least two medical devices, the processor is specifically configured to receive online requests, which are transmitted by the at least two medical devices, and extract the patient support binding information or the patient binding information from the online requests.

In one embodiment, in order to receive device association information; and classify the medical devices with the association relationship from the at least two medical devices, into a same device group, according to the device association information; the processor is specifically configured to: receive the device association information, which is transmitted by an online medical device, wherein the device association information is configured to indicate other medical device(s), which is(are) associated with the online medical device; wherein the online medical device is any one of the at least two medical devices; and determine the other medical device(s) as belonging to a device group to which the online medical device belongs, when the other medical device(s) is/are online; wherein a patient support or patient, which is associated with the device group to which the online medical device belongs, is a patient support or patient, which is associated with the online medical device.

In one embodiment, in order to receive device association information and; classify the medical devices with the association relationship from the at least two medical devices, into a same device group according to the device association information; the processor is specifically configured to receive the device association information, which is transmitted by an online medical device, wherein the device association information is configured to indicate a patient, who is associated with other medical device(s), wherein the online medical device is any one of the at least two medical devices; and determine the other medical device(s) as belonging to a device group to which the online medical device belongs, when a patient, who is associated with the online medical device is the patient, who is associated with the other medical device(s).

In one embodiment, in order to receive device association information; and classify the medical devices with the association relationship from the at least two medical devices, into a same device group, according to the device association information; the processor is specifically configured to receive the device association information, which is from multiple medical devices and transmitted by a terminal device, wherein different device association information indicates patients who are associated with different medical devices; and classify medical devices, which are associated with a same patient into a same device group, according to the device association information from the multiple medical devices.

In one embodiment, in order to receive device association information; and classify the medical devices with the association relationship from the at least two medical devices, into a same device group, according to the device association information; the processor is specifically configured to receive the device association information, which is transmitted by a terminal device, wherein the device association information carries multiple medical device identifiers; and classify multiple medical devices, which are represented by the multiple medical device identifiers into a same device group.

In one embodiment, the processor is further configured to when detecting that a medical device, which is associated with a device group to be switched, is online, and detecting that the online medical device is of a same type as a medical device to be switched, in the device group to be switched; switch medical data of the medical device to be switched, which medical data is currently displayed in the display area, to medical data of the online medical device; wherein the device group to be switched is any one device group of the at least one device group, and the medical device to be switched is any one medical device in the device group to be switched.

In one embodiment, in order to detect that a medical device, which is associated with a device group to be switched, is online, and detect that the online medical device is of a same type as a medical device to be switched, in the device group to be switched, the processor is specifically configured to detect that the medical device, which is associated with the device group to be switched, is online; detect that the online medical device is of the same type as the medical device to be switched in the device group to be switched; and receive the medical data, which is transmitted by the online medical device.

In one embodiment, the communication module is further configured to transmit to the online medical device, working parameter(s) of the medical device to be switched, so that the online medical device synchronizes its working parameter(s) with the working parameter(s) of the medical device to be switched.

In one embodiment, the processor is further configured to delete a medical device to be switched from a device group, to which the medical device to be switched belongs, when receiving a termination request for the medical device to be switched.

Figure 12:
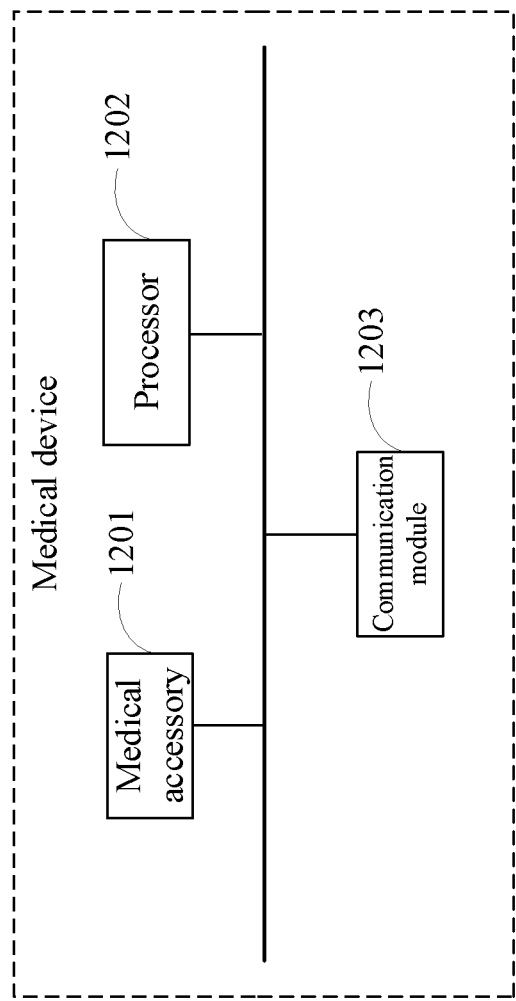
FIG. 12 is a structural diagram of a medical device.

In addition, an embodiment of this disclosure also provides a medical device. As shown in FIG. 12, the medical device can specifically include: a medical accessory 1201, a processor 1202, and a communication module 1203.

The medical accessory is configured to acquire medical data from patient and transmit the medical data to the processor. If the medical device is a monitor, the medical accessory includes one or more physiological parameter sensor accessories. If the medical device is an infusion pump, then the medical accessory is an accessory used for infusion, and so on.

The processor is configured to acquire device association information, which is configured to represent an association relationship between the medical device and other medical device, which is other than the medical device, wherein the medical device has a different device type from the other medical device, and the medical device or other medical device at least include a monitoring device; and configured to acquire the medical data transmitted by medical accessory.

The communication module is configured to transmit the device association information to a central station which is in communication connection with a target medical device, wherein the device association information is for the central station to classify medical devices which are associated with a same patient into a same device group; and configured to transmit the medical data of the patient to the central station.

In one embodiment, the association relationship includes association with a same patient support or with a same patient.

In one embodiment, in order to acquire device association information, the processor is specifically configured to acquire a device identifier of the medical device and a device identifier of the other medical device; and associate the device identifier of the medical device with the device identifier of other medical device to acquire the device association information.

In one embodiment, the medical device further includes an input device, a display module, or a code scanning device;
  in order to acquire device association information, the processor is specifically configured to receive, through input by a user from the input device, the device identifier of the other medical device; display, through the display module, at least one device identifier, and determine a device identifier, which is selected by a user as the device identifier of the other medical device, in response to selection operation of the user for the at least one device identifier; or acquiring, through the code scanning device, the device identifier of the other medical device.

In one embodiment, in order to acquire device association information, the processor is specifically configured to acquire a patient identifier, which is associated with the medical device and a patient identifier, which is associated with the other medical device as the device association information; or acquire a patient support identifier, which is associated with the medical device and a patient support identifier, which is associated with the other medical device as the device association information.

Figure 13:
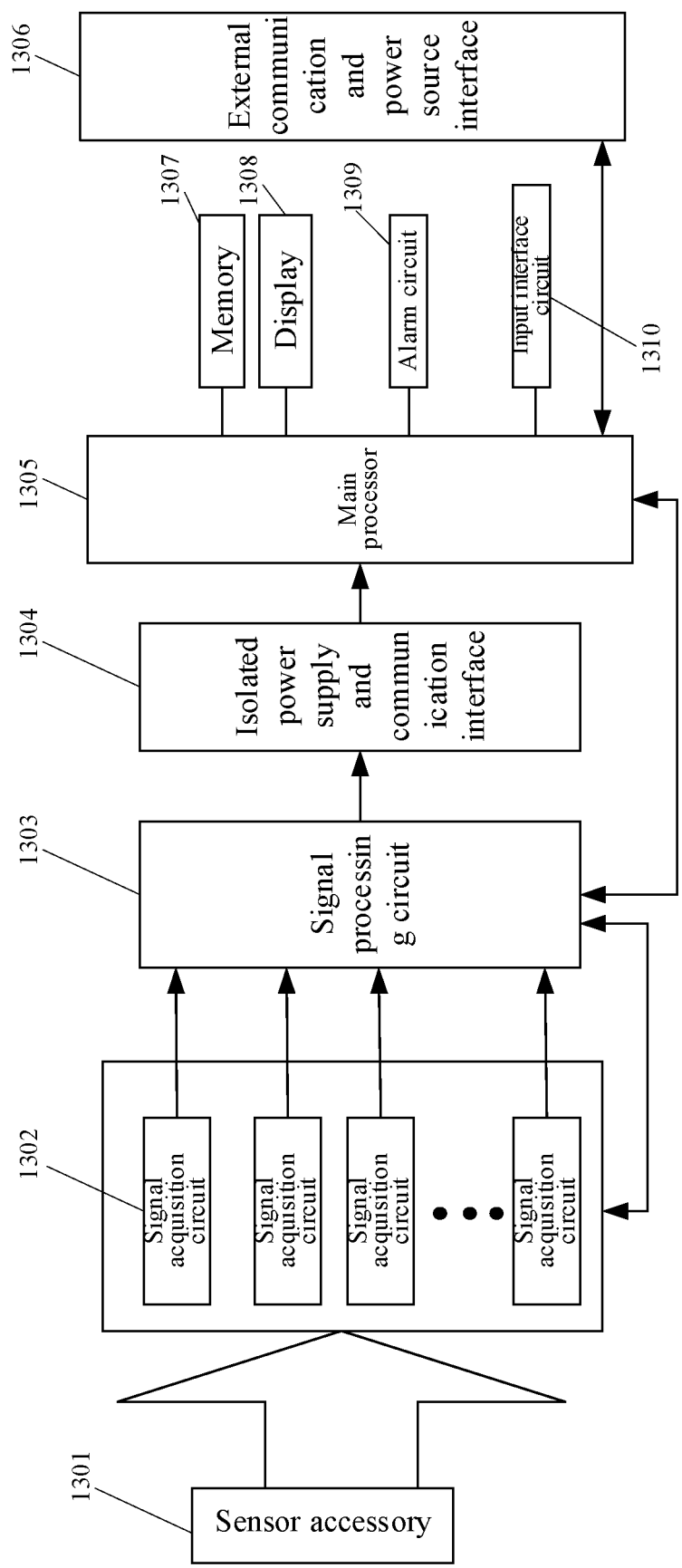
FIG. 13 is a structural diagram of a monitor.

Specifically, the medical device is explained using monitor as an example. FIG. 13 provides a structural framework diagram of a multi-parameter monitor.

The multi-parameter monitor has an independent housing, with a sensor interface area on the housing panel, which integrates multiple sensor interfaces for connecting to various external physiological parameter sensor accessories 1301. The housing panel also includes a small IXD display area, a display 1308, an input interface circuit 1310, and an alarm circuit 1309 (such as LED alarm area). The parameter processing module of the monitor is used for external communication with and power supply acquisition from the host. The parameter processing module also supports a plug-in parameter module, or can form a plug-in monitor by inserting into the host of the monitor and serving as a part of the monitor, or can be connected with the host of the monitor via a cable and using the build-out parameter module as an external accessory of the monitor. In addition, the multi-parameter monitor includes a memory 1307 for storing various data generated during computer programs and related management processes.

The internal circuit of the parameter processing module is placed inside the housing, as shown in FIG. 13, including at least two signal acquisition circuits 1302, a signal processing circuit 1303, and a main processor 1305, corresponding to physiological sign parameters.

The main processor 1305 can implement the processing related steps in various embodiments of the medical device management methods applied to a medical device.

The signal acquisition circuit 1302 can be selected from an electrocardiogram circuit, respiratory circuit, body temperature circuit, blood oxygen circuit, non-invasive blood pressure circuit, invasive blood pressure circuit, etc. These signal acquisition circuits 1302 are respectively electrically connected with corresponding sensor interfaces, for electrical connection to sensor accessories 1301 corresponding to different physiological parameters. Output terminals of the signal acquisition circuits 1302 are coupled to a front-end signal processor, a communication port of the front-end signal processor is coupled to the main processor, and the main processor is electrically connected to an external communication and power supply interface.

Various physiological parameter measurement circuits can adopt universal circuits in existing technologies. The front-end signal processor completes sampling and analog-to-digital conversion of the signal acquisition circuit output signal, and outputs control signals to control the measurement process of physiological signals. These parameters include but are not limited to: electrocardiogram parameter, respiratory parameter, body temperature parameter, blood oxygen parameter, non-invasive blood pressure parameter, and invasive blood pressure parameter.

The front-end signal processor can be implemented using microcontroller or other semiconductor devices, as well as ASIC or FPGA. The front-end signal processor can be powered by an isolated power supply. After simple processing and packaging, the sampled data is transmitted to the main processor through an isolated communication interface. For example, the front-end signal processor circuit can be coupled to the main processor 1305 through an isolated power supply and communication interface 1304.

Supplying electrical power to the front-end signal processing circuit through the isolated power supply has a function of isolating the patient from the power supply device through isolating the DC/DC power supply via a transformer. In such a way, the application part is floating through the isolation transformer, such that the leakage current passing through the patient is small enough, and bad influences on boards and devices of intermediate circuits, such as main control board (guaranteed by creepage distance and electrical clearance), due to voltage or energy generated during a defibrillation or electric knife application, can be prevented.

The main processor completes the calculation of physiological sign parameters, and transmits the calculation results and waveforms of parameters to the host through external communication and power interface (such as the host with display, PC, central station, etc.). The external communication and power source interface 1306 may be one or a combination of local area network interfaces composed of Ethernet, Token Ring, Token Bus, and optical fiber distributed data interface (FDDI) as the backbone of these three networks, may also be one or a combination of wireless interfaces such as infrared, Bluetooth, WIFI, and WMTS communication, or may also be one or a combination of wired data connection interfaces such as RS232 and USB.

The external communication and power interface 1306 can also be one or a combination of wireless data transmission interfaces and wired data transmission interfaces. The host can be any computer device, such as a host of the monitor, an electrocardiograph, an ultrasonic diagnosis instrument, a computer, etc. A monitor can be formed by means of installing them with matching software. The host may also be a communication device, such as a mobile phone, and the parameter processing module sends data to a mobile phone that supports Bluetooth communication via a Bluetooth interface to realize remote data transmission.

Figure 14:
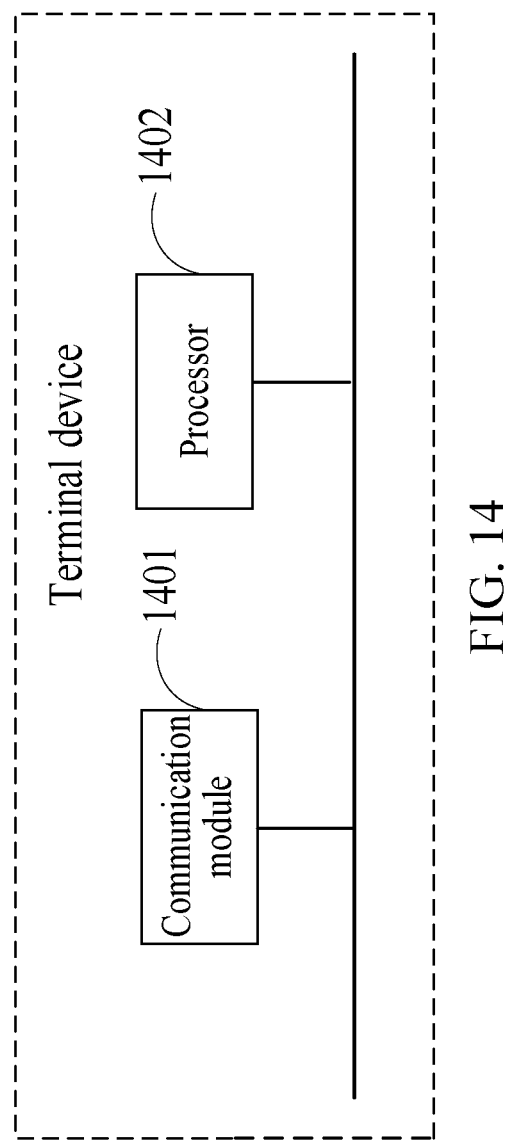
FIG. 14 is a structural diagram of a terminal device.

In addition, an embodiment of this disclosure also provides a terminal device, as shown in FIG. 14, which includes a processor 1402 and a communication module 1401. The terminal device can be in various specific forms, such as mobile phone, tablet, desktop computer, portable computer, etc.

The processor 1402, is configured to acquire device association information, wherein different device association information indicates patients who are associated with different medical devices, wherein the different medical devices include at least two types of medical devices, and one medical device of the at least two types of medical devices, is a monitoring device.

The communication module 1401 is configured to transmit the device association information to a central station which is in communication connection with a target medical device, wherein the device association information is for the central station to classify medical devices which are associated with a same patient into a same device group.

In one embodiment, in order to acquire device association information, the processor is specifically configured to acquire a device identifier of at least one medical device and a patient identifier of a patient, who is bound to the at least one medical device; and take the device identifier and the patient identifier as the device association information of the at least one medical device.

In one embodiment, the terminal device further includes an input device, a display module, or a code scanning device; in order to acquire a device identifier of at least one medical device and a patient identifier of a patient, who is bound to the at least one medical device, the processor is specifically configured to receive, through input by a user from the input device, the device identifier of the at least one medical device and the patient identifier of the patient, who is bound to the at least one medical device; control the display module to display at least one device identifier and at least one patient identifier, and acquire the device identifier of the at least one medical device and the patient identifier of the patient, who is bound to the at least one medical device, in response to selection operation of a user; or acquire, through the code scanning device, the device identifier of the at least one medical device and the patient identifier of the patient, who is bound to the at least one medical device.

It should be noted that each embodiment in this specification is described in a progressive manner, and each embodiment focuses on the differences from other embodiments. The same and similar parts between each embodiment can be referred to each other. For the above explanation of the disclosed embodiments, the features recorded in each embodiment in this disclosure can be replaced or combined with each other, enabling those skilled in the art to implement or use this disclosure.

It should also be noted that in this disclosure, relational terms, such as first and second, are only used to distinguish one entity or operation from another entity or operation, and do not necessarily require or imply any actual relationship or order between these entities or operations. Moreover, the terms "including", "comprising", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including a/the . . . " do not exclude the existence of other identical elements in the process, method, item, or device that includes the aforementioned elements.

The above explanation of the disclosed embodiments enables one skilled in the art to implement or use this disclosure. The various modifications to these embodiments are apparent to one skilled in the art, and the general principles defined in this disclosure can be implemented in other embodiments without departing from the spirit or scope of this disclosure. Therefore, this disclosure is not limited to the embodiments shown, but rather to the widest range consistent with the principles and novel features disclosed herein.

What is claimed is:

1. A central station, comprising:
    a communication module, in communication connection with at least two medical devices, wherein medical devices of two different types in the at least two medical devices are in communication connection with the central station through different channels and one of the two different types is a monitoring device type;
    a processor, configured to receive medical data that are transmitted by a target medical device, and to determine a target device group corresponding to the target medical device from at least one device group, wherein the target medical device is any one of the at least two medical devices, and the at least two medical devices comprise at least two types of medical devices; wherein each device group consists of medical devices having an association relationship among the at least two medical devices; and a display module, configured to display the medical data from the target medical device in a display area on a patient monitoring interface of the central station, wherein the display area corresponds to the target device group, different display areas correspond to different device groups, and one display area is configured to display medical data from a monitoring device and medical data from at least one medical device of a different type from the monitoring device, wherein the monitoring device and the at least one medical device of a different type are within a corresponding device group;

wherein the processor is further configured to:

determine, in response to a viewing instruction of a user for medical devices in a target medical institution, a target viewing device group associated with the target medical institution from the at least one device group wherein the target viewing device group comprises at least one group; and determine medical data corresponding to a same target viewing device group from the medical data that are transmitted by the at least two medical devices;

wherein the display module is further configured to:

display, in the display area of the patient monitoring interface, the medical data of the target viewing device group corresponding to the display area.

2. The central station according to claim 1, wherein the association relationship between the medical devices comprises: the medical devices within a same device group are associated with a same patient support, or the medical devices within a same device group are associated with a same patient.

3. The central station according to claim 1, wherein in order to determine target viewing device groups associated with the target medical institution from the at least one device group, the processor is configured to:

determine a target patient support or a target patient associated with the target medical institution; and determine a device group associated with the target patient support or the target patient as the target viewing device group associated with the target medical institution.

4. The central station according to claim 1, wherein before the display module is further configured to display, in the display area of the patient monitoring interface, the medical data of the target viewing device groups corresponding to the display areas, the processor is further configured to:

determine a user identity, wherein the user identity is configured to indicate a data item of the medical data that the user expects to view; and determine target medical data corresponding to the data item from the medical data of the target viewing device group corresponding to the display area of the patient monitoring interface;

wherein in order to display, in the display area of the patient monitoring interface, the medical data of the target viewing device group corresponding to the display area, the display module is configured to:

display, in the display area of the patient monitoring interface, the target medical data corresponding to the display area.

5. The central station according to claim 4, wherein in order to determine the user identity, the processor is configured to:

receive a customized viewing instruction from the user, wherein the customized viewing instruction carries the user identity;

acquire biometric information of the user, and identify the user identity according to the biometric information; or acquire a user identifier from a user information recording carrier, and determine the user identity from the user identifier.

6. The central station according to claim 1, wherein the target viewing device group comprises multiple target viewing device groups;

in order to display, in the display area of the patient monitoring interface, the medical data of the target viewing device group corresponding to the display area, the display module is configured to:

display, in multiple display areas of the patient monitoring interface, the medical data transmitted by medical devices within the multiple target viewing device groups, wherein the medical data comprises one or more of vital sign parameter waveform, vital sign parameter value, physiological alarm, and working parameter of the medical devices.

7. The central station according to claim 1, wherein the processor is further configured to:

align the medical data transmitted by medical devices within a same device group, according to a timestamp of the medical data, and store the aligned medical data as a medical data record set.

8. The central station according to claim 7, wherein:

the display module is further configured to:

display the medical data record corresponding to any individual device group, wherein the individual device group is indicated by a medical data review instruction when receiving the medical data review instruction for the individual device group; or the processor is further configured to:

synchronize a clock of the central station with the at least two medical devices, so as to enable the at least two medical devices to generate timestamps of medical data according to the synchronized clock.

9. The central station according to claim 1, wherein before determining the target device group corresponding to the target medical device from at least one device group, the processor is further configured to:

receive device association information; and classify the medical devices with the association relationship from the at least two medical devices into a same device group according to the device association information, wherein the device association information is configured to represent the association relationship between the medical devices.

10. The central station according to claim 9, wherein in order to receive device association information and to classify the medical devices with the association relationship from the at least two medical devices into a same device group according to the device association information, the processor is configured to:

receive patient support binding information or patient binding information transmitted by the at least two medical devices, wherein the patient support binding information represents a patient support bound to a medical device of the at least two medical devices, the patient binding information represents a patient bound to a medical device of the at least two medical devices; and determine medical devices bound to a same patient support as belonging to the same device group according to the patient support binding information of the at least two medical devices, or determine medical devices bound to a same patient as belonging to the same device group according to the patient binding information of the at least two medical devices.

11. The central station according to claim 10, wherein in order to receive patient support binding information or patient binding information transmitted by the at least two medical devices, the processor is configured to:
receive online requests transmitted by the at least two medical devices, and extract the patient support binding information or the patient binding information from the online requests.

12. The central station according to claim 9, wherein in order to receive device association information and to classify the medical devices with the association relationship from the at least two medical devices into a same device group according to the device association information, the processor is configured to:
receive the device association information transmitted by an online medical device, wherein the device association information is configured to indicate other medical devices associated with the online medical device, wherein the online medical device is any one of the at least two medical devices; and determine the other medical devices as belonging to a device group to which the online medical device belongs when the other medical devices are online, wherein a patient support or a patient associated with the device group to which the online medical device belongs is a patient support or a patient associated with the online medical device; or
receive the device association information transmitted by an online medical device, wherein the device association information is configured to indicate a patient associated with other medical devices, wherein the online medical device is any one of the at least two medical devices; and determine the other medical devices as belonging to a device group to which the online medical device belongs when a patient associated with the online medical device is the patient associated with the other medical devices; or
receive the device association information from multiple medical devices and transmitted by a terminal device, wherein different device association information indicates patients associated with different medical devices; and classify medical devices associated with a same patient into the same device group according to the device association information from the multiple medical devices; or
receive the device association information transmitted by a terminal device, wherein the device association information carries multiple medical device identifiers; and classify multiple medical devices represented by the multiple medical device identifiers into the same device group.

13. The central station according to claim 1, wherein the processor is further configured to:
when detecting that a medical device associated with a device group to be switched is online, and detecting that the online medical device is of a same type as a medical device to be switched in the device group to be switched, switch the currently displayed medical data of the medical device to be switched in the display area to medical data of the online medical device,
wherein the device group to be switched is any one of the at least one device group, and the medical device to be switched is any medical device within the device group to be switched.

14. The central station according to claim 13, wherein:
before switching the currently displayed medical data of the medical device to be switched in the display area to the medical data of the online medical device, the processor is further configured to:
receive the medical data transmitted by the online medical device; or
the communication module is further configured to:
transmit working parameters of the medical device to be switched to the online medical device, so that the online medical device synchronizes its working parameters with the working parameters of the medical device to be switched.

15. The central station according to claim 1, wherein the processor is further configured to:
delete a medical device to be switched from a device group, to which the medical device to be switched belongs, when receiving a termination request for the medical device to be switched.

16. A medical device, comprising:
a processor, configured to acquire device association information and represent an association relationship between the medical device and other medical devices, wherein the medical device has a different type from the other medical devices, the medical device or the other medical devices comprise at least one monitoring device; and configured to acquire medical data of a patient; and
a communication module, configured to transmit the device association information to a central station that is in communication connection with the medical device, wherein the central station uses the device association information to classify the medical device and the other medical devices into a same device group; and configured to transmit the medical data of the patient to the central station;
wherein the processor is further configured to:
determine, in response to a viewing instruction of a user for medical devices in a target medical institution, a target viewing device group associated with the target medical institution from the at least one device group wherein the target viewing device group comprises at least one group; and
determine medical data corresponding to a same target viewing device group from the medical data that are transmitted by the at least two medical devices;
wherein the display module is further configured to:
display, in the display area of the patient monitoring interface, the medical data of the target viewing device group corresponding to the display area.

17. The medical device according to claim 16, wherein:
the association relationship comprises: association with a same patient support or a same patient; or
in order to acquire device association information, the processor is configured to:
acquire a device identifier of the medical device and device identifiers of other medical devices; and associate the device identifier of the medical device with the device identifiers of the other medical devices, so as to acquire the device association information; or acquire a patent identifier associated with the medical device and a patient identifier associated with the other medical devices, as the device association information; or acquire a device identifier associated with the medical device and a device identifier associated with the other medical devices, as the device association information.

18. A terminal device, comprising:

a processor, configured to acquire device association information, wherein different device association information indicates patients associated with different medical devices, wherein the different medical devices comprise at least two types of medical devices, and one medical device of the at least two types of medical devices is a monitoring device; and a communication module, configured to transmit the device association information to a central station that is in communication connection with a target medical device, wherein the central station uses the device association information to classify medical devices associated with a same patient into a same device group;

wherein the processor is further configured to:

determine, in response to a viewing instruction of a user for medical devices in a target medical institution, a target viewing device group associated with the target medical institution from the at least one device group wherein the target viewing device group comprises at least one group; and determine medical data corresponding to a same target viewing device group from the medical data that are transmitted by the at least two medical devices;

wherein the display module is further configured to:

display, in the display area of the patient monitoring interface, the medical data of the target viewing device group corresponding to the display area.

19. The terminal device according to claim 18, wherein in order to acquire device association information, the processor is configured to:

acquire a device identifier of at least one medical device and a patient identifier of a patient bound to the at least one medical device; and use the device identifier and the patient identifier as the device association information of the at least one medical device.

* * * * *